United States Patent
Dormody et al.

(10) Patent No.: US 12,038,280 B2
(45) Date of Patent: *Jul. 16, 2024

(54) CALIBRATING A PRESSURE SENSOR

(71) Applicant: NextNav, LLC, Sunnyvale, CA (US)

(72) Inventors: Michael Dormody, San Jose, CA (US); Deepak Joseph, Oakton, VA (US); Badrinath Nagarajan, Cupertino, CA (US); Guiyuan Han, San Jose, CA (US); Arun Raghupathy, Bangalore (IN)

(73) Assignee: NextNav, LLC, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/363,329

(22) Filed: Aug. 1, 2023

(65) Prior Publication Data
US 2023/0384097 A1    Nov. 30, 2023

Related U.S. Application Data

(63) Continuation of application No. 17/647,826, filed on Jan. 12, 2022, now Pat. No. 11,761,765, which is a
(Continued)

(51) Int. Cl.
*G01C 17/38* (2006.01)
*G01C 5/06* (2006.01)
(Continued)

(52) U.S. Cl.
CPC .............. *G01C 17/38* (2013.01); *G01C 5/06* (2013.01); *G01C 21/10* (2013.01); *G01C 21/165* (2013.01);
(Continued)

(58) Field of Classification Search
CPC ........ G01C 17/38; G01C 17/46; G01C 17/50; G01C 5/00; G01C 5/0009; G01C 5/0027;
(Continued)

(56) References Cited

U.S. PATENT DOCUMENTS

| 5,646,857 A | 7/1997 | McBurney et al. |
| 5,652,592 A | 7/1997 | Sanderford et al. |

(Continued)

FOREIGN PATENT DOCUMENTS

| CN | 101995236 A | 3/2011 |
| CN | 102075936 A | 5/2011 |

(Continued)

OTHER PUBLICATIONS

Angelo Sabatini et al: "A Stochastic Approach to Noise Modeling for Barometric Altimeters", Sensors, vol. 13, No. 11, Nov. 18, 2013 (Nov. 18, 20138), .pp. 15692-15707. XP055419074, DOI: 10.3390/s131115692 equation 5: p. 15695; table 1.

(Continued)

*Primary Examiner* — Anthony R Jimenez
(74) *Attorney, Agent, or Firm* — MLO, a professional corp.

(57) ABSTRACT

Calibrating a pressure sensor of a mobile device includes determining a first plurality of calibration values for a first plurality of visits to a first revisit zone to which a mobile device repeatedly returns; determining a first relative calibration adjustment value based on the first plurality of calibration values; determining an adjusted absolute calibration value based on i) an absolute calibration value used to calibrate pressure measurements made by a pressure sensor of the mobile device, and ii) the first relative calibration adjustment value; and calibrating pressure measurements made by the pressure sensor of the mobile device using the adjusted absolute calibration value.

19 Claims, 15 Drawing Sheets

Related U.S. Application Data continuation-in-part of application No. 17/644,029, filed on Dec. 13, 2021, now Pat. No. 11,892,295, which is a continuation of application No. 16/684,859, filed on Nov. 15, 2019, now Pat. No. 11,199,406, which is a continuation of application No. 15/692,142, filed on Aug. 31, 2017, now Pat. No. 10,514,258.

(60) Provisional application No. 62/489,926, filed on Apr. 25, 2017, provisional application No. 62/385,911, filed on Sep. 9, 2016.

(51) Int. Cl.

| | | |
|---|---|---|
| *G01C 21/10* | | (2006.01) |
| *G01C 21/16* | | (2006.01) |
| *G01C 25/00* | | (2006.01) |
| *G01S 5/02* | | (2010.01) |
| *G01S 19/14* | | (2010.01) |
| *G01S 19/40* | | (2010.01) |

(52) U.S. Cl.
CPC ........... *G01C 25/00* (2013.01); *G01C 25/005* (2013.01); *G01S 5/02* (2013.01); *G01S 19/14* (2013.01); *G01S 19/40* (2013.01)

(58) Field of Classification Search
CPC ...... G01C 5/36; G01C 5/0045; G01C 5/0063; G01C 5/06; G01C 5/01; G01C 21/10; G01C 21/165; G01C 25/00; G01C 25/005; G01C 25/02; G01C 2205/00; G01C 2205/001; G01C 2205/008; G01C 5/02; G01C 21/16; G01S 19/14; G01S 19/40; G01S 13/00; G01S 13/882; G01S 5/02; G01S 2013/08; G05D 1/00; G05D 1/02; G05D 1/04; G05D 1/06; Y10S 903/93; B60W 2550/22; B60W 2550/408; B60W 2710/18; B60W 2710/305; B60W 10/06; B60W 10/08; B60W 20/12; B60W 20/11; B60W 20/40; B60L 7/18; B60L 2240/62
USPC .................................................. 701/408, 22
See application file for complete search history.

(56) References Cited

U.S. PATENT DOCUMENTS

| | | | |
|---|---|---|---|
| 6,522,298 | B1 | 2/2003 | Burgett et al. |
| 6,678,630 | B1 | 1/2004 | Joder et al. |
| 6,970,795 | B1 | 11/2005 | Burgett et al. |
| 7,428,466 | B2 | 9/2008 | Makela et al. |
| 7,429,948 | B2 | 9/2008 | Burgett et al. |
| 7,991,405 | B2 | 8/2011 | Zhao |
| 8,174,931 | B2 | 5/2012 | Vartanian et al. |
| 8,188,912 | B1 | 5/2012 | Weisenburger |
| 8,412,158 | B2 | 4/2013 | Forutanpour et al. |
| 8,566,032 | B2 | 10/2013 | Chowdhary et al. |
| 8,706,131 | B2 | 4/2014 | Winters |
| 10,514,258 | B2 | 12/2019 | Dormody et al. |
| 11,199,406 | B2 | 12/2021 | Dormody et al. |
| 2001/0047230 | A1 | 11/2001 | Gremmert et al. |
| 2007/0218823 | A1 | 9/2007 | Wolf |
| 2007/0239326 | A1 | 10/2007 | Johnson et al. |
| 2008/0046214 | A1 | 2/2008 | Fowler |
| 2010/0212421 | A1 | 8/2010 | Young et al. |
| 2012/0072110 | A1* | 3/2012 | Venkatraman ......... G01C 21/08 701/434 |
| 2012/0087212 | A1 | 4/2012 | Vartanian et al. |
| 2012/0265373 | A1 | 10/2012 | Ingvalson et al. |
| 2015/0127287 | A1 | 5/2015 | Wolf et al. |
| 2015/0330780 | A1 | 11/2015 | Yuzawa et al. |
| 2016/0003949 | A1 | 1/2016 | Venkataraman et al. |
| 2016/0047648 | A1 | 2/2016 | Edge et al. |

FOREIGN PATENT DOCUMENTS

| | | |
|---|---|---|
| CN | 103189717 A | 7/2013 |
| CN | 103414825 A | 11/2013 |
| CN | 103718058 A | 4/2014 |
| CN | 104748722 A | 7/2015 |
| CN | 105684260 A | 6/2016 |
| CN | 105745522 A | 7/2016 |
| CN | 105874302 A | 8/2016 |
| JP | H01307614 A | 12/1989 |
| WO | 2015063340 A1 | 5/2015 |
| WO | 2016102142 A1 | 6/2016 |

OTHER PUBLICATIONS

Anonymous, Wi-Fi positioning system—Wikipedia, Nov. 7, 2014, URL:https://en.wikipedia.org/w/index.php?title=Wi%ADFi_position.
European Search Report dated Nov. 17, 2022 for European Patent Office Patent Application No. 22168943.3.
Form PCT/ISA/206, PCT/US2017/049570, "Invitation to pay additional fees and, where applicable, protest fee", 9 page(s);EPO Form P04A42, PCT/ US2017/049570, "Information on Search Strategy", 1 page(s); EPO Form 1717 04.17, PCT/ US2017/049570, "Information on Search Strategy", 1 page(s); EPO Form 1707 04.17, PCT/US2017/049570, "Information on search strategy", 8 page(s); Date of Mailing Nov. 16, 2017.
Form PCT/ISA/220, PCT/US2017/049570, "Notification of Transmittal of the International Search Report and the Written Opinion of the International Searching Authority, or the Declaration", 1 page(s); Form PCT/ISA/210, PCT/US2017/049570, "International Search Report", 6 page(s); EPO Form P04A42, PCT/US2017/049570, "Information on Search Strategy", 1 page(s); Form PCT/ISA/237, PCT/US2017/049570, "Written Opinion of the International Searching Authority", 13 page(s). Date of Mailing Jan. 9, 2018.
Liu Wei et al., A MINS Optical Detector Integrated Navigation System, Geomatics and Information Science of Wuhan University, No. 12, 1392-1395 pgs, Dec. 5, 2010.
Notice of Allowance and Fees dated Aug. 13, 2021 for U.S. Appl. No. 16/684,859.
Notice of Allowance and Fees dated May 8, 2023 for U.S. Appl. No. 17/647,826.
Office Action dated Aug. 3, 2022 for European Patent Office Patent Application No. 22168943.3.
Office Action dated Dec. 22, 2021 for European Patent Office Patent Application No. 17767957.8.
Office Action dated Dec. 25, 2020 for Chinese Patent application No. 201780051088.1.
Office Action dated Feb. 9, 2021 for U.S. Appl. No. 16/684,859.
Office Action dated Jun. 9, 2021 for China Patent Application No. 201780051088.1.
Office Action dated Nov. 10, 2022 for U.S. Appl. No. 17/647,826.
Office Action dated Nov. 26, 2021 for Republic of Korea Patent Application No. 10-2019-7007704.
Office Action dated Nov. 9, 2020 for European Patent application No. 17767957.8.
Office Action dated Oct. 28, 2020 for U.S. Appl. No. 16/684,859.
Office Action dated Oct. 5, 2022 for U.S. Appl. No. 17/644,029.
Office Action dated Sep. 17, 2021 for China Patent Application No. 201780051088.1.
Shu-Lan Xia et al., A Temperature Compensation Algorithm Based onCurve Fitting and Spline Interpolation, Chemical Engineering Transactions, Jul. 31, 2016, pp. 1345-1350, URL:https://www.aidic.it/cet/16/51 /225.pdf.
Siltanen, Sanni et al., Interactive Outdoor Mobile Augmentation using Markerless Tracking and GPS, 1-5 pgs, ResearchGate, Oct. 21, 2015.
Werner, et al., Indoor positioning using smartphone camera, Sep. 21, 2011, International Conference, pp. 1-6, Munich, Germany.

(56) References Cited

OTHER PUBLICATIONS

Xia, Shu-Lan, et al., "A Temperature Compensation Algorithm Based on Curve Fitting and Spline Interpolation", Chemical Engineering Transactions, Jul. 31, 2016, 6 pages, Retrieved from the Internet: URL: https://www.aidic.it/cet/16/51/225.pdf, retrieved on Oct. 22, 2020].

* cited by examiner

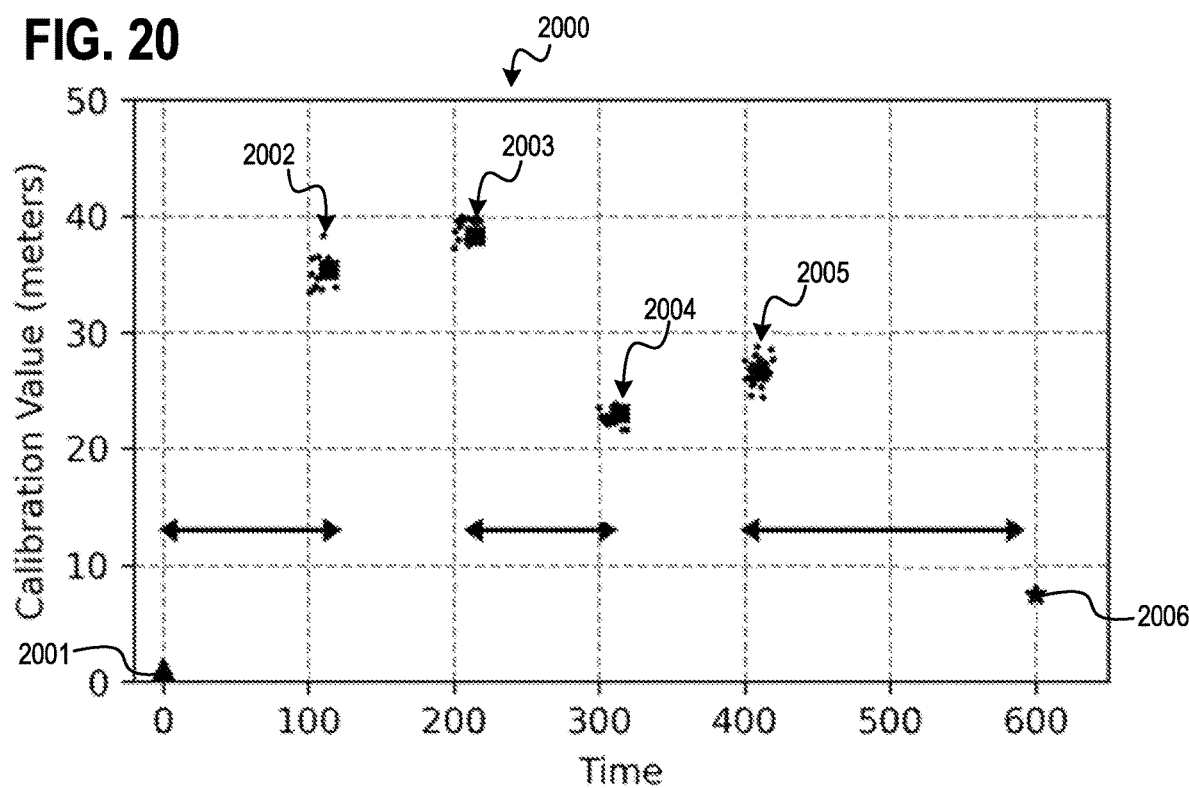

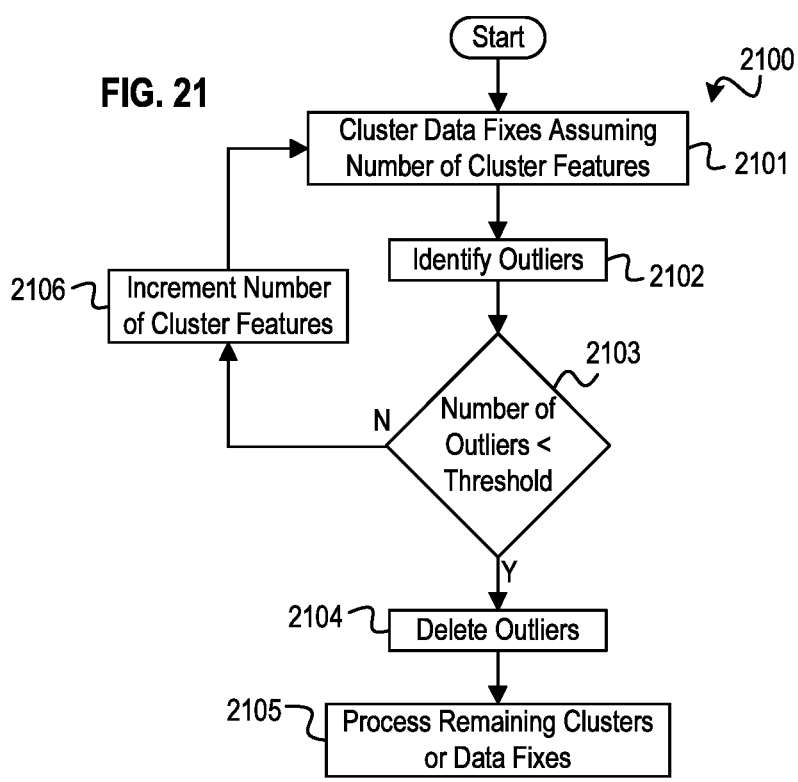

CALIBRATING A PRESSURE SENSOR

CROSS-REFERENCE TO RELATED APPLICATIONS

This application is a continuation of U.S. patent application Ser. No. 17/647,826, filed on Jan. 12, 2022, which is a continuation-in-part of U.S. patent application Ser. No. 17/644,029, filed on Dec. 13, 2021, which is a continuation of U.S. patent application Ser. No. 16/684,859, filed on Nov. 15, 2019, now U.S. Pat. No. 11,199,406, issued Dec. 14, 2021, which is a continuation of U.S. patent application Ser. No. 15/692,142, filed on Aug. 31, 2017, now U.S. Pat. No. 10,514,258, issued Dec. 24, 2019, which claims priority to U.S. Provisional Patent Application No. 62/385,911, filed on Sep. 9, 2016, and U.S. Provisional Patent Application No. 62/489,926, filed on Apr. 25, 2017, all of which are hereby incorporated herein by reference in their entirety.

BACKGROUND

Smart phones and other mobile devices use a variety of sensors for detecting motion and for generating estimated positions of the mobile device. Such sensors include pressure sensors, accelerometers, gyroscopes, and magnetometers. Such sensors are typically low cost and are unstable because the sensors are subject to drift over time, which results in erroneous measurements of pressure or movement that are not within a tolerated threshold value from the true pressure or movement. Drift is a phenomenon whereby the unstable sensor's measurements of circumstances deviate from the true values of those circumstances over time—e.g., the value at zero motion gradually drifts away from zero even when the sensor is not moving. The drift may be monotonic, or it may gradually change direction and return toward zero accumulated drift. Because drift cannot be predictably modeled, it is difficult to determine a correction model in advance.

Depending upon the use of an unstable sensor, drift can have significant effects. For example, if an accelerometer indicates even a slight acceleration when no movement is occurring, an application for tracking a mobile device's movement could assume the mobile device is actually moving away from the spot where the measurement started. Similarly, if measurements by a pressure sensor begin to drift away from true pressure, estimating a mobile device's altitude using an inaccurately measured pressure value will result in a significantly erroneous estimated altitude that cannot be used for emergency response or other applications. Even when unstable sensors are calibrated at the time of manufacture or at the time of installation, such sensors are still prone to drift in the field when used over time. Thus, there is a need for calibrating unstable sensors.

SUMMARY

In some embodiments, a method incudes determining a first plurality of calibration values for a first plurality of visits to a first revisit zone to which a mobile device repeatedly returns; determining a first relative calibration adjustment value based on the first plurality of calibration values; determining an adjusted absolute calibration value based on i) an absolute calibration value used to calibrate pressure measurements made by a pressure sensor of the mobile device, and ii) the first relative calibration adjustment value; and calibrating pressure measurements made by the pressure sensor of the mobile device using the adjusted absolute calibration value.

In some embodiments, a method incudes determining an absolute calibration value used to calibrate pressure measurements by a pressure sensor of a mobile device; determining a first revisit zone as a first location to which the mobile device repeatedly returns; determining a first calibration for a first visit to the first revisit zone; determining a second calibration for a second visit to the first revisit zone; determining a first relative calibration adjustment value based on a difference between the first calibration and the second calibration; determining an adjusted absolute calibration value based on a sum of the absolute calibration value and the first relative calibration adjustment value; and estimating an altitude of the mobile device based on a pressure measurement by the pressure sensor and the adjusted absolute calibration value.

In some embodiments, the method further includes determining a second revisit zone as a second location to which the mobile device repeatedly returns; determining a first calibration for a first visit to the second revisit zone; determining a second calibration for a second visit to the second revisit zone; determining a second relative calibration adjustment value based on a difference between the first calibration and the second calibration for the first and second visits to the second revisit zone; determining an overall relative calibration adjustment value based on the first relative calibration adjustment value and the second relative calibration adjustment value; and determining the adjusted absolute calibration value based on a sum of the absolute calibration value and the overall relative calibration adjustment value.

In some embodiments, the method further includes determining an absolute calibration confidence for the absolute calibration value; determining an aged absolute calibration confidence based on an age of the absolute calibration value; determining a first calibration confidence for the first calibration for the first visit to the first revisit zone; determining a second calibration confidence for the second calibration for the second visit to the first revisit zone; determining a relative calibration confidence based on the first calibration confidence and the second calibration confidence; and determining an adjusted absolute calibration confidence for the adjusted absolute calibration value based on the aged absolute calibration confidence and the relative calibration confidence.

In some embodiments, the method further includes determining a first plurality of data fixes collected during the first visit; identifying first anomalous data fixes in the first plurality of data fixes; forming a first subset of the first plurality of data fixes by deleting the first anomalous data fixes from the first plurality of data fixes; determining the first calibration for the first visit to the first revisit zone based on the first subset of the first plurality of data fixes; determining a second plurality of data fixes collected during the second visit; identifying second anomalous data fixes in the second plurality of data fixes; forming a second subset of the second plurality of data fixes by deleting the second anomalous data fixes from the second plurality of data fixes; and determining the second calibration for the second visit to the second revisit zone based on the second subset of the second plurality of data fixes.

BRIEF DESCRIPTION OF THE DRAWINGS

FIGS. 18-20 illustrate graphs of example calibration values vs time for data collections during repeat visits to locations, in accordance with some embodiments.

FIG. 21 illustrates a simplified example anomaly detection process, in accordance with some embodiments.

DETAILED DESCRIPTION

Figure 1:
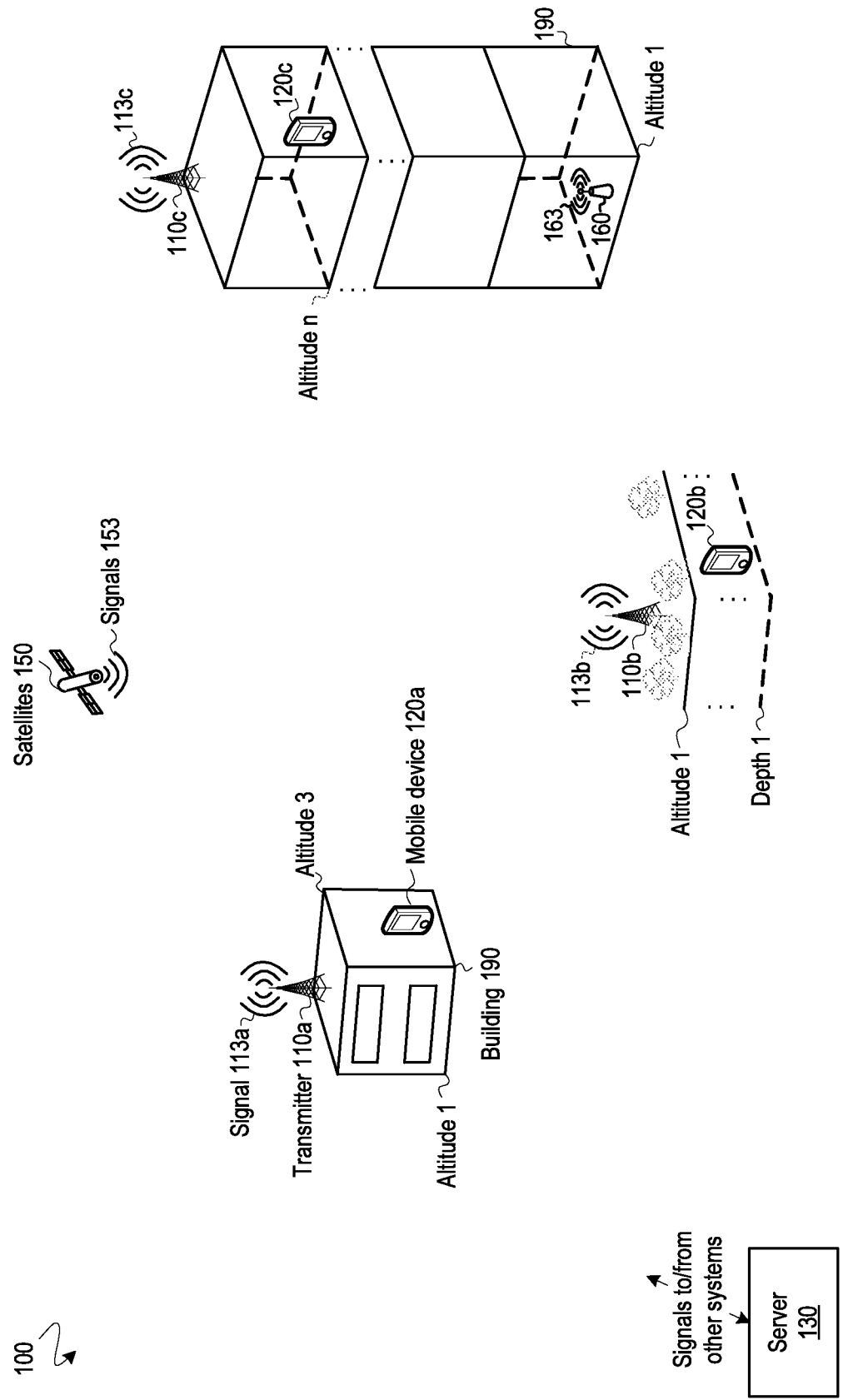
FIG. 1 depicts an operational environment for calibrating unstable sensors.

Systems and methods for calibrating unstable sensors are described below. Attention is initially drawn to an operational environment 100 for calibrating unstable sensors illustrated in FIG. 1. The operational environment 100 contains a network of terrestrial transmitters 110, any number of mobile devices 120, and a server 130. The transmitters 110 and the mobile devices 120 may be located at different altitudes or depths that are inside or outside various natural or manmade structures (e.g., buildings 190). Signals 113, 153 and 163 are respectively exchanged between the mobile devices 120 and the transmitters 110, satellites 150, and/or other nodes 160 using known wireless or wired transmission technologies. The transmitters 110 may transmit the signals 113 using one or more common multiplexing parameters—e.g., time slot, pseudorandom sequence, or frequency offset. The server 130 and the mobile devices 120 may exchange information with each other.

Figure 2A:
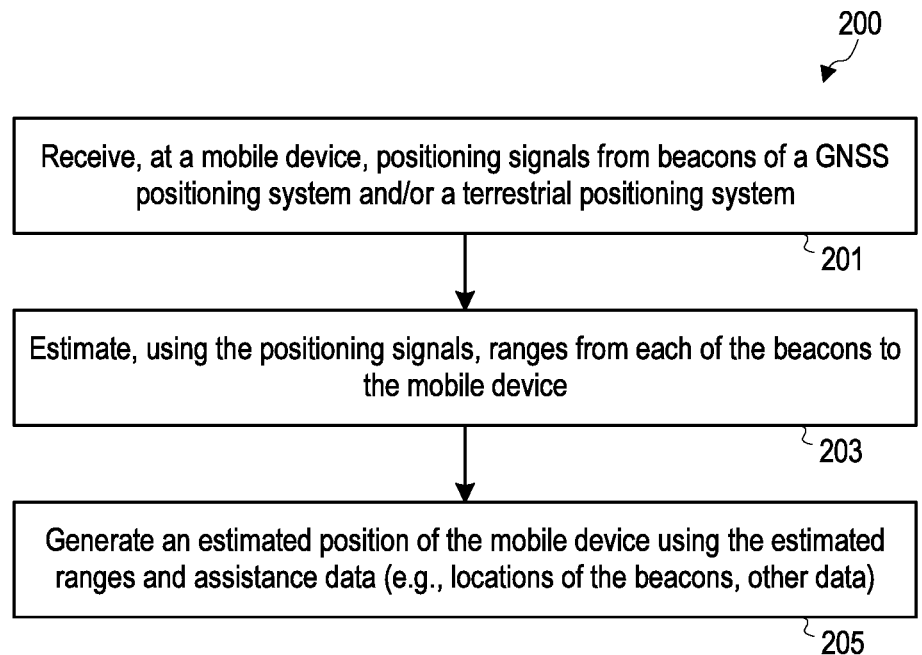
FIG. 2A illustrates a process for generating an estimated position of a mobile device without using a pressure or inertial sensor of a mobile device.
Figure 2B:
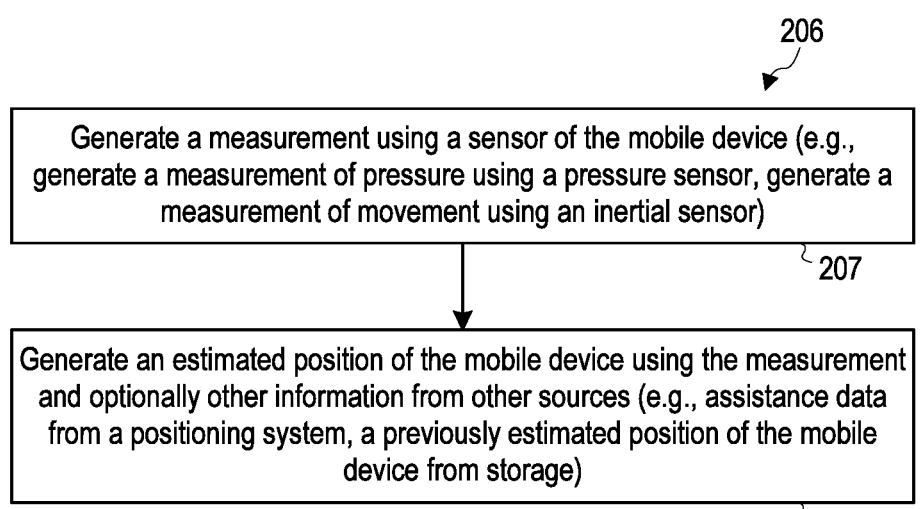
FIG. 2B illustrates a process for generating an estimated position of a mobile device using a pressure or inertial sensor of a mobile device.

Two processes for generating an estimated position of a mobile device (e.g., any of the mobile devices 120) are illustrated in FIG. 2A and FIG. 2B. A process 200 for generating an estimated position of the mobile device without using a measurement from a pressure sensor or an inertial sensor of the mobile device is provided in FIG. 2A. A process 206 for generating an estimated position of the mobile device using a measurement from the pressure sensor or the inertial sensor of the mobile device is provided in FIG. 2B. The estimated positions may be represented in terms of: latitude, longitude, and/or altitude; x, y, and/or z coordinates; angular coordinates; or other representations known in the art.

As shown in FIG. 2A, positioning signals are received at mobile device at step 201, as is known in the art. Positioning signals are also commonly referred to as ranging signals. In one embodiment, the positioning signals are received by an antenna of the mobile device, as is known in the art. The positioning signals may include the signals 153 from a GNSS positioning system that includes the satellites 150, and/or the signals 113 from a terrestrial positioning system that includes the transmitters 110.

Ranges between each of the beacons and the mobile device are estimated using the received positioning signals at step 203. In one embodiment, the ranges are estimated by a processor or other suitable machine as is known in the art. Each range between a beacon and the mobile device may be estimated as the distance traveled by the positioning signal transmitted from that beacon before being received by the mobile device. If position information like the transmission time and reception time of that positioning signal are known, then the difference between those times multiplied by speed of light would provide an estimate of the distance traveled by that positioning signal from that beacon to the mobile device.

At step 205, an estimated position of the mobile device is generated using the estimated ranges and assistance data (e.g., locations of the beacons). In one embodiment, the estimated position is generated by a processor or other suitable machine as is known in the art. One well-known approach for generating the estimated position of the mobile device using different estimated ranges corresponding to different positioning signals from different beacons, and also using assistance data like the locations of those beacons, is known as trilateration. For reference, particular methods for generating the estimated position of the mobile device using positioning signals is described in U.S. Pat. No. 8,130,141, issued Mar. 6, 2012.

Unfortunately, the distance traveled by a positioning signal from a beacon to the mobile device does not always occur along a "line-of-sight" path—i.e., the shortest distance between the beacon and the mobile device. Instead, intervening blockages from objects (e.g., buildings, walls, doors) between the beacon and the mobile device cause the positioning signal to travel along multiple paths between successive intervening blockages before reaching the mobile device. The sum of these multiple paths is typically much longer than the line-of-sight path. Estimating the position of a mobile device using the sum of the multiple paths as the estimated range between a beacon and a mobile device will result in an estimated position that has error. Using an estimated position with such an error may be unacceptable. Thus, other approaches may be used, including a process illustrated in FIG. 2B for generating an estimated position of the mobile device using a measurement from a pressure sensor or an inertial sensor of a mobile device.

As provided in FIG. 2B, a measurement is generated by a sensor of the mobile device at step 207. In one embodiment, a measurement of atmospheric pressure at the mobile device is generated using a pressure sensor, as is known in the art. In another embodiment, a measurement of movement of the mobile device is generated using an inertial sensor, as is known in the art. At step 209, an estimated position of the mobile device is generated using the measurement. Other information may also be used to generate the estimated position.

In one implementation of step 209, the estimated position (e.g., an estimated altitude) is generated using a measurement of pressure by a pressure sensor of the mobile device and assistance data from reference sensors that measure pressures and temperatures at different locations. One example of estimating a mobile device's altitude using measurements of pressure is an altimeter/barometric-based approach described in U.S. Patent Application Publication No. US 2012/0182180, published Jul. 19, 2012. For example, a reference pressure ($P_{reference}$), an reference temperature (T), and a pressure measured by the mobile device ($P_{mobile\ device}$) may be used to estimate the altitude of the mobile device ($Altitude_{estimated}$) as follows:

$$Altitude_{estimated} = \frac{RT}{gM} \ln\left(\frac{P_{reference}}{P_{mobile\ device}}\right),$$

where g corresponds to the acceleration due to gravity, R is the universal gas constant, and M is the molar mass of dry air. The reference pressure ($P_{reference}$) may be a measurement of pressure from a reference pressure sensor, or may be an estimated pressure for a reference altitude that is based on the measurement of pressure from the reference pressure sensor.

In another implementation of step 209, the estimated position (e.g., in one, two or three dimensions) is generated using measured movement of the mobile device from a previously estimated position of the mobile device. One example of estimating a mobile device's position using measured movement includes adjusting a previously estimated position of the mobile device retrieved from storage by a distance that is converted from a velocity that was measured by an inertial sensor of the mobile device, as is known in the art.

Unfortunately, estimated positions that are generated using measured pressure or measured movement of the mobile device can be inaccurate when the measured pressure or measured movement are subject to unacceptable error caused by drift of a sensor that generated the measurement. The drift may be monotonic, or it may gradually change direction and return toward zero accumulated drift. The time scale over which the sensor drifts into an unstable state that produces an unacceptable error can be anything from several minutes, to several days, to several weeks, or longer. The time scale will determine how frequently the sensor must be calibrated. In one embodiment, unacceptable error is error that exceeds a threshold amount of error set to a value that depends on circumstances (e.g., 12 Pa or 20 Pa for pressure sensors).

Since error may be introduced into an estimated position of the mobile device when a measurement from an unstable sensor is used to estimate the position, it is desirable to estimate the error in the measurement, and use that estimated error to calibrate future measurements by the unstable sensor. If an estimated position of the mobile device can be determined without using erroneous measurements from the unstable sensors, then errors due to drift of the unstable sensor can be measured and logged over time. In one embodiment, errors due to drift of the unstable sensor can be measured and logged over time by comparing two estimates of a mobile device's position, using the difference between the two estimates to estimate the error, and then using the error to generate a calibration value for the sensor. By way of example, the two estimates of the mobile device's position preferably include a first estimated position determined without using erroneous measurements from the unstable sensors, and a second estimated position determined using erroneous measurements from the unstable sensors.

In some cases, only one error is used as a calibration value without the need to log and combine sensor errors over time. However, even though estimation of sensor drift is probabilistic and provides useful measurements of the sensor error most of the time, any individual sensor measurement can have a significant amount of measurement noise. Fortunately, once a threshold number N of measurements have been collected (where N may vary depending on the circumstances), outliers can be discarded and the general trend of the measurements can be established. This trend represents the sensor error over time. Thus, by observing the change in logged sensor errors over time, sensor error due to drift can be identified and corrected by determining sensor calibration values or by adjusting previous calibration values (e.g., a previous factory calibration value), and so on.

There are two general approaches for measuring sensor error. The first approach includes: (a) determining when the mobile device is at a known position; (b) computing the difference between the known position and an estimated position that was determined using a measurement of an unstable sensor; (c) using the computed difference to determine the error in the measurement from the unstable sensor; and (d) using the error to calibrate the measurement and future measurements from the unstable sensor. The first approach provides an absolute measurement of the sensor error, i.e., a highly reliable or accurate calibration value can be obtained with an absolute calibration. (An "absolute" measurement or calibration is not considered "perfect" or errorless.) However, opportunities where the mobile device is at a known precise position may be limited. Thus, a second approach may be needed. The second approach is a relative approach. That is, if it can be established that the mobile device has returned to a position where the mobile device has resided in the past, then the difference between the estimated position determined in the past and the current estimated position of the mobile device can be used to determine the measurement error due to drift of the unstable sensor over the time between the two measurements.

Detail about calibrating an unstable sensor of a mobile device is provided below with reference to FIG. 3, which illustrates a process 300 for calibrating an unstable sensor of a mobile device. Opportunities for ongoing sensor calibration can occur periodically, a-periodically, as directed by a user of the mobile device, at the occurrence of an event, or at a time that leverages other processes or applications that are active on the mobile device. It is noted that each estimated position described herein may be represented in terms of: latitude, longitude, and/or altitude; x, y, and/or z coordinates; angular coordinates; or other representations known in the art.

Figure 3:
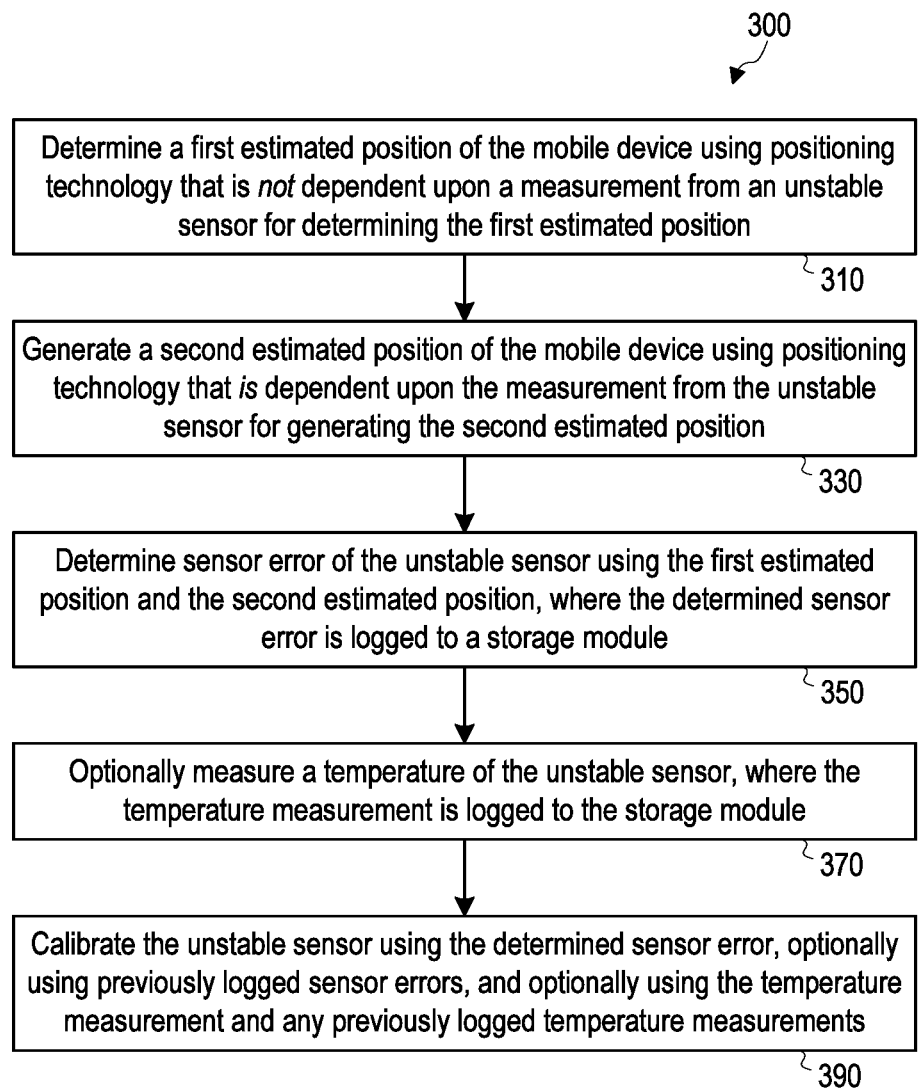
FIG. 3 illustrates a process for calibrating an unstable sensor of a mobile device.

As shown in FIG. 3, a first estimated position of the mobile device is determined using positioning technology that is not dependent upon a measurement from an unstable sensor at step 310. In one implementation, the first estimated position is determined without using a measurement of pressure from a pressure sensor of the mobile device. In another implementation, the first estimated position is determined without using a measurement of movement from an inertial sensor of the mobile device. Examples of approaches for determining a first estimated position that is not dependent upon a measurement from an unstable sensor may include:

(a) determining the first estimated position using positioning signals received from satellites, transmitters or other beacons (e.g., using trilateration to generate the first estimated position in terms of one, two or three dimensions);

(b) using information that specifies a characteristic of the mobile device's position to determine that the first estimated position includes position parameter(s) of a known position or previously estimated position associated with that information—for example:

(i) receiving estimated latitude and longitude, looking up an outdoor ground-level altitude stored in association with the estimated latitude and longitude, and using the ground-level altitude as the first estimated position;

(ii) receiving information specifying movement of the mobile device in excess of a predefined non-vertical ambulatory velocity, looking up a road-level altitude stored in association with a region within which the mobile device is moving, and using the road-level altitude as the first estimated position;

(iii) receiving user input specifying a predefined location at which the mobile device is located (e.g., a home, a workplace location, a business or other location, or a floor of a building), looking up latitude, longitude and/or altitude stored in association with that predefined location, and using the latitude, longitude and/or altitude as the first estimated position;

(iv) receiving input specifying an event (e.g., the mobile device is charging, the battery of the mobile device is changing at a particular rate, or the mobile device has stopped moving), identifying a condition (e.g., the event is occurring during a predefined time of day, after a predefined movement of the mobile device, or when particular latitude and longitude are estimated using positioning signals), looking up a predefined location associated with the event and the condition, and using latitude, longitude and/or altitude stored in association with the predefined location as the first estimated position;

(v) receiving captured input (e.g., an image captured by front and/or rear cameras of the mobile device, or audio captured by a microphone of the mobile device), looking up a predefined location associated with the captured input, and using latitude, longitude and/or altitude stored in association with the predefined location as the first estimated position;

(vi) receiving a signal from a beacon of a local area network, looking up latitude, longitude and/or altitude stored in association with the beacon, and using the latitude, longitude and/or altitude as the first estimated position; and/or (vii) measuring a signal strength of a signal received from a beacon, looking up latitude, longitude and/or altitude stored in association with a location at which the measured signal strength can be received, and using the latitude, longitude and/or altitude as the first estimated position.

When predefined locations are used for the first estimated position, the predefined locations can be identified from local or external storage. In some embodiments, the predefined locations were previously estimated using positioning technology that was dependent upon a previous measurement from the unstable sensor when the unstable sensor was calibrated—i.e., when any error in the previous measurement was below a tolerated amount of error.

At step 330, a second estimated position of the mobile device is determined using positioning technology that is dependent upon the measurement from the unstable sensor. In one implementation, known techniques are used to generate the second estimated position using a measurement of pressure from the pressure sensor of the mobile device. In another implementation, known techniques are used to generate the second estimated position using a measurement of movement from the inertial sensor of the mobile device.

At step 350, an error in measurement of the unstable sensor is determined using the first estimated position and the second estimated position. This error in measurement is referred to herein as a "sensor error". The determined sensor error is logged to a storage module (e.g., a memory of the mobile device, or a database of a server in communication with the mobile device). In one implementation, the sensor error may be determined by computing a difference between the second estimated position and the first estimated position, and then translating the computed difference to an error/calibration adjustment relative to the type of sensor.

In one implementation of step 350, when an altimeter/barometric based approach is used to determine the second estimated position using a measurement of pressure from the mobile device's unstable pressure sensor, a difference in altitude between the first estimated position and the second estimated position can be translated to a difference in pressure between the measurement of pressure, where the difference in pressure is used as a calibration value that adjusts future measurements from the pressure sensor. In one embodiment, the translation from an altitude difference to a pressure difference can be accomplished by applying a scaling factor of N Pascals per meter to the altitude difference, where N=12, 20 or another value. Thus, an altitude difference between the first estimated position (h EE p) and the second estimate position ($h_{SEP}$) results in an estimated pressure difference of $\Delta P = (h_{SEP} - h_{FEP})/N$. After the estimated pressure difference ($\Delta P$) is computed, pressure measurements can be calibrated to $P_{calibrated}$ by subtracting the estimated pressure difference ($\Delta P$) from a measurement of pressure (P) measured by the pressure sensor. By way of example, the calibrated pressure measurement may take the form of: $P_{calibrated} = P - \Delta P$.

In another implementation of step 350, when the second estimated position is determined using an inertial sensor that provides a measurement indicating movement by the mobile device from a previous position of the mobile device, and when the first estimated position indicates that the mobile device is at a known location at which the mobile device is not moving (e.g., the battery of the mobile device is charging), the measurement by the inertial sensor is used to compute the sensor error. For example, if an accelerometer generates a measurement of a=9.9 m/s$^2$, and a measurement indicative of no movement is 9.8 m/s$^2$ (due to gravity), then a difference $\Delta a = a - 9.8 = 0.1$ m/s$^2$ can be applied to future measurements by the accelerometer to result in a calibrated measurement $a_{calibrated} = a_{measurement} - \Delta a$. By way of another example, when a gyroscope provides measurements indicating rotation, and when the first estimated position indicates that the mobile device is at a known location at which the mobile device is not moving, the gyroscope can be calibrated by adjusting its measurements until the gyroscope measures no rotational movement.

At optional step 370, a temperature of the unstable sensor is measured, where the temperature measurement is logged to a storage module. A pressure sensor typically measures both barometric pressure and a local temperature. The measured local temperature can be used as the temperature measurement. Alternatively, a separate environmental sensor co-located with the pressure sensor at the mobile device may be used to generate the measurement of temperature.

At step 390, the measurement and/or future measurements of the unstable sensor are calibrated using a calibration value that is determined using the sensor error (e.g., where the calibration value is equal to the sensor error). In some embodiments, the measurement and/or future measurements of the unstable sensor are calibrated using previously logged sensor errors. Optionally, in certain embodiments like those described later with reference to FIG. 16 and FIG. 17, the measurement and/or future measurements of the unstable sensor are calibrated using the temperature measurement and previously logged temperature measurements.

Figure 4:
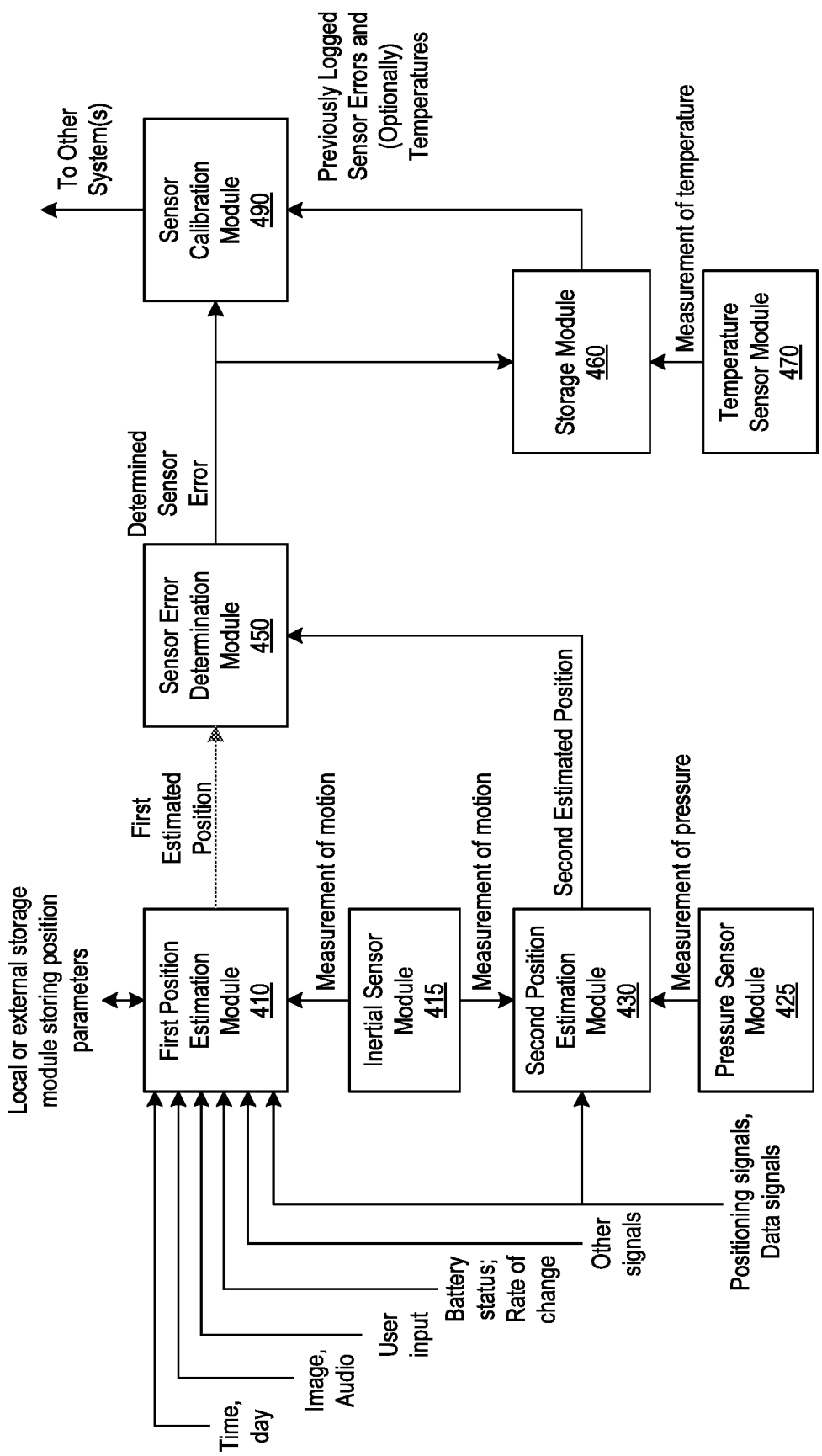
FIG. 4 depicts a system for calibrating an unstable sensor of a mobile device.

One embodiment of a system for calibrating an unstable sensor of a mobile device is depicted in FIG. 4. The system may be a mobile device 120 that includes modules that are each operable to carry out different steps of FIG. 3, including: a first position estimation module 410 operable to perform step 310; an inertial sensor module 415; a pressure sensor module 425; a second position estimation module 430 operable to perform step 330; a sensor error determination module 450 operable to perform step 350; a storage module 460; a temperature sensor module 470 operable to perform step 370; and a sensor calibration module 490 operable to perform step 390.

The second position estimation module 430 is shown to receive different things depending on the use of the mobile device 120. For example, the second position estimation module 430 may receive positioning signals and data signals from beacon(s) of a positioning system, and use those signals to estimate latitude and longitude as required. The inertial sensor module 415 and the pressure sensor module 425 are coupled to the second position estimation module 430. When used, the inertial sensor module 415 sends a measurement of movement to the second position estimation module 430, and the pressure sensor module 425 sends a measurement of pressure to the second position estimation module 430.

The first position estimation module 410 is shown to receive different things depending on the use of the mobile device 120. For example, the first position estimation module 410 may receive any of:
(a) positioning signals from beacon(s) of a positioning system;
(b) data signals from beacon(s) of a positioning system, a server connected to the mobile device, or another source (e.g., data signals carrying assistance information like locations of the beacons, reference pressures based on measurements from reference pressure sensors co-located with the beacon, reference temperature measurements from temperature sensors that are co-located with the reference pressure sensor or that are located at another location);
(c) other signals (e.g., a signal from a beacon of a local area network, such as a Bluetooth beacon or a Wi-Fi beacon);
(d) user input (e.g., from an application that retrieves user input from a touch screen of the mobile device);
(e) event input (e.g., detected charging status of the mobile device's battery, detected rate at which the capacity of the mobile device's battery is changing, sensed movement or lack of movement from the inertial sensor 415);
(f) condition input (e.g., a time of day and/or day of week received from another component of the mobile device or a cellular network, an earlier movement sensed from the inertial sensor 415, an estimated latitude and longitude of the mobile device, a stored pattern of movement);
(g) captured input (e.g., an image from a camera of the mobile device, audio data from a microphone of the mobile device, sensed motion from the inertial sensor module 415, or other input from another sensor of the mobile device);
(h) position parameters stored in the storage module 460 or elsewhere (e.g., altitudes stored in association with predefined latitudes and longitudes; e.g., latitudes, longitudes and/or altitudes stored in association with predefined outdoor locations, predefined indoor locations, predefined locations of beacons, predefined signal strengths of signals from beacons, predefined user input, predefined event input, predefined condition input, and/or predefined captured input); and/or
(i) other things (not shown, but described herein or understood in the art).

Depending on particular embodiments, when performing step 310 of FIG. 3, the first position estimation module 410 may receive particular information, and then use the particular information to determine the first estimated position during step 310.

In one embodiment, when positioning signals and data signals are received, those signals are used to estimate any of the mobile device's latitude, longitude or altitude, which may be used as the first estimated position.

In another embodiment, the first position estimation module 410 uses estimated latitude and longitude to query for position parameters from a storage module (e.g., the storage module 460 or an external database), which returns one or more position parameters (e.g., an altitude) associated with the latitude and longitude, and those one or more position parameters are used as the first estimated position.

In yet another embodiment, the first position estimation module 410 uses other information (e.g., time, day, captured audio, captured image(s), a battery charging status, a rate of change in battery capacity, user input, an indication the mobile device has stopped moving, a pattern of movement by the mobile device like a series of estimated positions, estimated latitude and longitude, an identifier of a beacon from a beacon signal, and/or a signal strength measured by the mobile device) to query for position parameters from the storage module, which returns one or more position parameters (e.g., latitude, longitude and/or altitude) associated with the other information, and those one or more position parameters are used as the first estimated position.

In yet another embodiment, the first position estimation module 410 uses certain information (e.g., a measured non-vertical velocity of the mobile device) to resolve uncertainty as to a general location of the mobile device (e.g., a non-vertical velocity above a threshold amount of velocity indicates the mobile device is outdoors in an area identified by other information), and then to query for position parameters from the storage module based on the general location of the mobile device in the identified area. By way of example, a non-vertical velocity of the mobile device is estimated, a determination is made as to whether the estimated non-vertical velocity exceeds a threshold amount of velocity, and the mobile device is determined to be outside if the estimated non-vertical velocity is determined to exceed the threshold amount of velocity. The estimated velocity is non-vertical so as to avoid mistaking a vertical velocity estimated while in an elevator as indicative of outdoor movement.

As shown in FIG. 4, both of the first position estimation module 410 and the second position estimation module 430 are coupled to the sensor error determination module 450. The first position estimation module 410 sends the first estimated position to the sensor error determination module 450, and the second position estimation module 430 sends the second estimated position to the sensor error determination module 450. The sensor error determination module 450 is coupled to the sensor calibration module 490 and to the storage module 460. The sensor error determination module 450 sends determined sensor error to the sensor calibration module 490 and to the storage module 460.

When used, the temperature sensor module 470 is coupled to the storage module 460, and sends measurements of temperature to the storage module 460.

The storage module 460 is coupled to the sensor calibration module 490, and sends previously logged sensor errors and optionally sends previously stored measurements of temperature to the sensor calibration module 490 for use in determining calibration values to apply to measurements from an unstable sensor like the pressure sensor module 425.

By way of example, the pressure sensor module 425 may include a pressure sensor, and the inertial sensor module 415 may include an accelerometer, a gyroscope, a magnetometer, and/or another inertial sensor. The temperature sensor module 470 may include any number of temperature sensors, one or more of which may be included within corresponding unstable sensors (e.g., the pressure sensor module 425 and/or the inertial sensor module 415) for measuring the temperatures of those unstable sensors. In one embodiment, the first position estimation module 410, the second position estimation module 430, the sensor error determination module 450, and the sensor calibration module 490 are implemented by one or more processors or other suitable machines.

Determining a First Estimated Position of the Mobile Device Using Positioning Technology that is not Dependent Upon a Measurement from the Unstable Sensor (Step 310

Figure 5:
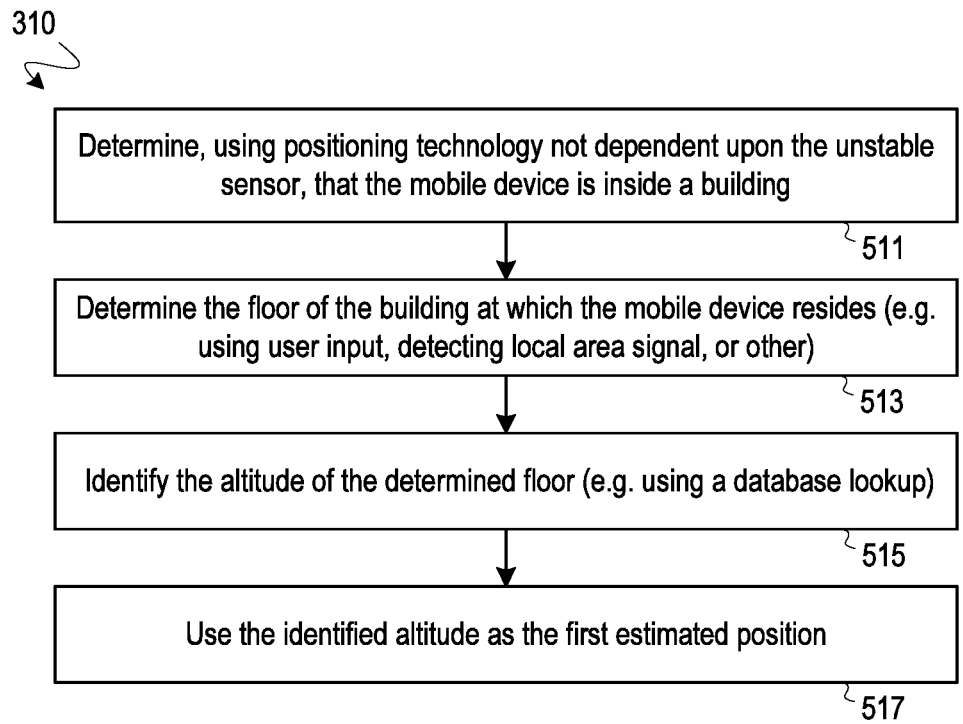
FIG. 5 illustrates a process for determining a first estimated position of a mobile device using positioning technology that is not dependent upon an unstable sensor.

One implementation of step 310 for determining a first estimated position of the mobile device using positioning technology that is not dependent upon a measurement from an unstable sensor includes sub-steps provided in FIG. 5.

As shown at step 511, positioning technology that is not dependent upon a measurement from the unstable sensor is used to determine that the mobile device is inside a building.

By way of example, the mobile device may be determined to be inside a building when the mobile device receives a signal from a particular beacon located in the building (i.e., when the mobile device is within range of that beacon), or when the mobile device enters a geo-fenced area inside the building.

In another embodiment, the mobile device may be determined to be inside a building when an estimated altitude of the mobile device (e.g., computed using positioning signals from beacons of a satellite system or a network of terrestrial transmitters) is higher than a threshold amount of distance above a ground level (e.g., higher than the height of a ground-level floor of the building).

Alternatively, the mobile device may be determined to be inside a building when the mobile device receives user input (e.g., a button press) from a user specifying that the mobile device is inside a building, which could be obtained from an application running on the mobile device that prompts the user to indicate the user's location as inside, outside, at a particular location, or other input.

In another embodiment, the mobile device may be determined to be inside a building when the mobile device receives positioning signals from beacons (e.g., from GNSS satellites or terrestrial transmitters), evaluates the received signals (e.g., for measured signal strength, signal directionality, signal multipath), and determines that:

(a) a measured signal strength of a signal from a beacon is within a threshold amount of strength from a stored signal strength of a different signal from that beacon that was previously measured from within the building;

(b) a measured signal strength of a signal from a beacon is within a threshold amount of strength from a predicted signal strength of a hypothetical signal from the beacon that penetrates the building;

(c) signal(s) from a first set of origins are received (e.g., from a first range of azimuthal or elevation angles), but signal(s) from a second set of origins are not received (e.g., from a second range of azimuthal or elevation angles);

(d) an estimated range of a signal from a beacon is within a threshold amount of distance from a stored estimated range of a different signal from the beacon that was previously measured from within the building; and/or (e) an estimated range of a signal from a beacon is within a threshold amount of distance from a predicted range of a hypothetical signal from the beacon that penetrates the building.

In an alternative embodiment of step 511, despite possible error in a measurement of pressure by an unstable pressure sensor, the measurement of pressure may be used to determine that the mobile device is inside the building after the measurement is used to estimate an altitude that is higher than a threshold amount of distance above a ground level. Even though the potentially inaccurate measurement may not be helpful in resolving floor-level accuracy, the measurement can still be used to determine that the mobile device is on an unknown floor of the building.

Other approaches for determining that the mobile device is inside a building are described in co-owned U.S. Pub. No. 20160003949, published Jan. 7, 2016, entitled SYSTEMS AND METHODS FOR ESTIMATING WHETHER A MOBILE DEVICE IS INSIDE OR OUTSIDE A BUILDING.

At step 513, the floor of the building at which the mobile device resides is determined. Various implementations of step 513 may include: using user input that designates a floor; looking up a floor that is associated with a beacon identifier delivered in a signal received from the beacon; receiving a floor number as data in a received signal from a beacon; looking up a floor that is associated with one or more signal strengths measured by the mobile device; detecting an event and a condition, and looking up a floor that is associated with the event and condition; estimating an amount of vertical movement by the mobile device from a previously determined floor, adjusting the previously determined floor by the estimated vertical movement, and looking up a floor that is associated with the result of adjusting the previously determined floor by the estimated vertical movement; or other approaches described herein.

At step 515, the altitude of the determined floor is identified (e.g., from a database of floor altitudes using a database lookup, obtained from a signal received by the mobile device from a beacon, or other approach). The identified altitude of the identified floor may be optionally adjusted by a factor to account for the height at which the mobile device is assumed to be above the identified altitude (e.g., 1-2 meters above the ground-level altitude). Of course, recorded altitudes of floors can already reflect the 1-2 meter adjustment from a floor-level altitude.

At step 517, the identified altitude of the identified floor, or the identified altitude adjusted by the factor, is then used as the estimated altitude of the first estimated position.

Determining a First Estimated Position of the Mobile Device Using Positioning Technology that is not Dependent Upon a Measurement from the Unstable Sensor (Step 310

Figure 6:
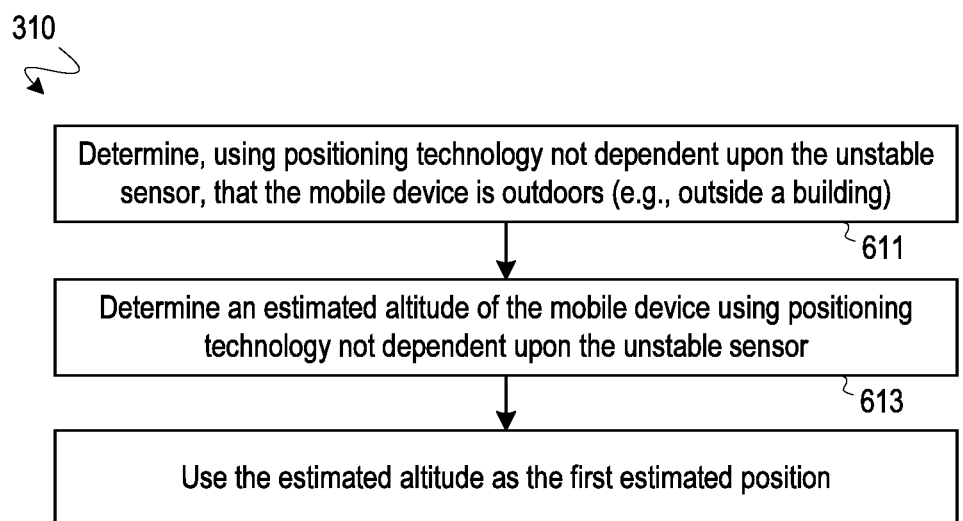
FIG. 6 illustrates another process for determining a first estimated position of a mobile device using positioning technology that is not dependent upon an unstable sensor.

Another implementation of step 310 for determining a first estimated position of the mobile device using positioning technology that is not dependent upon a measurement from an unstable sensor includes sub-steps provided in FIG. 6.

As shown at step 611, positioning technology that is not dependent upon a measurement from the unstable sensor is used to determine that the mobile device is outdoors (i.e., not inside a building). Implementations of step 611 are discussed later with reference to FIG. 7 through FIG. 9. In some cases, location information obtained by friend finder applications, camera applications, and navigation applications that regularly obtain the location information from the mobile device can be used to determine the mobile device is outdoors or inside a building (e.g., each time new information is available from these applications, a map and elevation database can be accessed to determine if the mobile device is outdoors or inside a building). This approach saves battery power of the mobile device because it does not require determining position information solely for the purpose of sensor calibration.

At step 613, an estimated altitude of the mobile device is determined using positioning technology that is not dependent upon the unstable sensor. Implementations of step 611 are discussed later with reference to FIG. 10 through FIG. 11.

At step 615, the estimated altitude is used as the first estimated position.

Determining, Using Positioning Technology that is not Dependent Upon the Unstable Sensor, that the Mobile Device is Outdoors (Step 611

Figure 7:
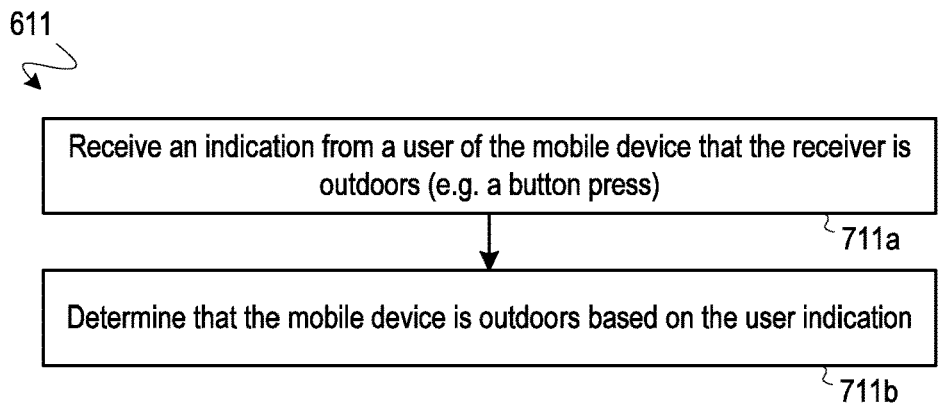
FIG. 7 illustrates a process for determining that a mobile device is outdoors using positioning technology that is not dependent upon an unstable sensor.

One implementation of step 611 for determining that the mobile device is outdoors using positioning technology that is not dependent upon a measurement from an unstable sensor includes sub-steps provided in FIG. 7. As shown, at step 711a, an indication (e.g., a button press) is received from a user of the mobile device specifying that the mobile device is outdoors, which could be obtained from an application running on the mobile device that prompts the user to indicate the user's location as inside a building, outdoors, at a particular location, or other input. Then, at step 711b, the mobile device is determined to be outdoors when the user indication indicates mobile device is outdoors.

Figure 8:
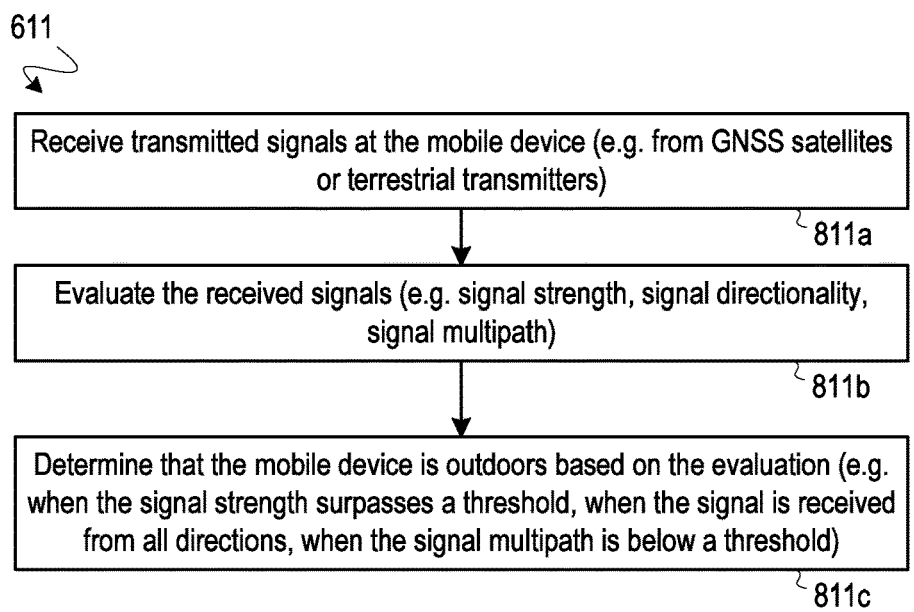
FIG. 8 illustrates another process for determining that a mobile device is outdoors using positioning technology that is not dependent upon an unstable sensor.

Another implementation of step 611 for determining that the mobile device is outdoors using positioning technology that is not dependent upon a measurement from an unstable sensor includes sub-steps provided in FIG. 8. As shown at step 811a, positioning signals are received at the mobile device (e.g., from GNSS satellites or terrestrial transmitters). The received signals are evaluated (e.g., for measured signal strength, signal directionality, and/or signal multipath) at step 811b. Then, at step 811c, the mobile device is determined to be outdoors based on the evaluation of the received signals. Implementations of step 811c may include determining the mobile device is outdoors when: the measured signal strengths exceed a threshold amount of signal strength; the signals were received from multiple directions; the measured signal-to-noise ratios of received signals are above a threshold value; and/or the detected signal multipath is below a threshold value of multipath (e.g., as determined based on detecting multiple signal peaks from a correlation result, where multipath above the threshold value is detected when there are peaks that are earlier than the expected or main peak). Strong signals from multiple directions and/or low multipath strongly suggests the mobile device is outside in an open area and therefore probably at ground level.

Figure 9:
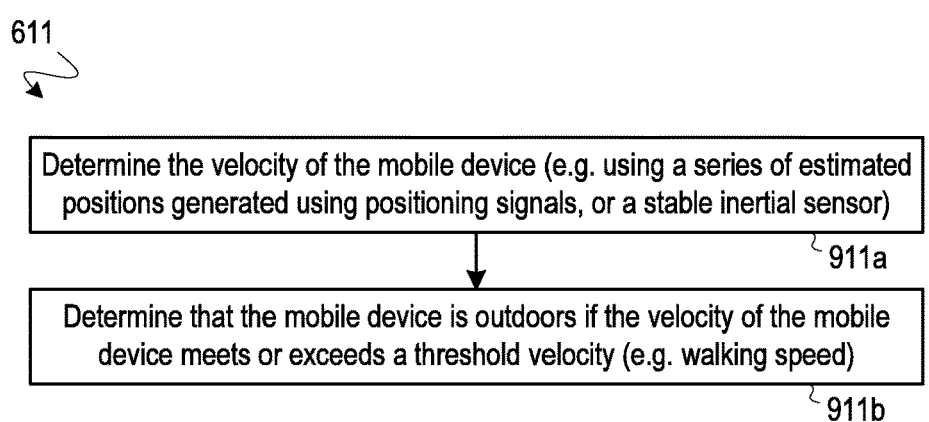
FIG. 9 illustrates yet another process for determining that a mobile device is outdoors using positioning technology that is not dependent upon an unstable sensor.

Yet another implementation of step 611 for determining that the mobile device is outdoors using positioning technology that is not dependent upon a measurement from the unstable sensor sub-steps provided in FIG. 9. As shown at step 911a, the velocity of the mobile device is determined (e.g., by using a series of estimated positions determined using positioning signals, or by using measurements of a calibrated inertial sensor). Then, at step 911b, the mobile device is determined to be outdoors when the velocity of the mobile device meets or exceeds a threshold velocity (e.g., pedestrian walking speed). If the mobile device is inside an automobile, the mobile device will most likely be 1-2 meter above a level of a road.

Other approaches for determining that the mobile device is outdoors are described in co-owned U.S. Pub. No. 20160003949, published Jan. 7, 2016, entitled SYSTEMS AND METHODS FOR ESTIMATING WHETHER A MOBILE DEVICE IS INSIDE OR OUTSIDE A BUILDING.

Determining an Estimated Altitude of the Mobile Device Using Positioning Technology that is not Dependent Upon a Measurement from the Unstable Sensor (Step 613

Figure 10:
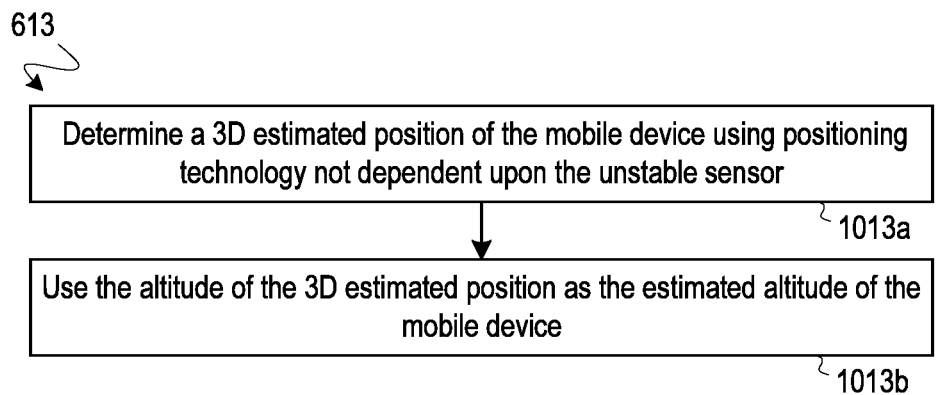
FIG. 10 illustrates a process for determining an estimated altitude of a mobile device using positioning technology that is not dependent upon an unstable sensor.

One implementation of step 613 for determining an estimated altitude of the mobile device using positioning technology that is not dependent upon a measurement from an unstable sensor includes sub-steps provided in FIG. 10. As shown at step 1013a, a three-dimensional estimated position of the mobile device is determined using positioning technology that is not dependent upon a measurement from the unstable sensor (e.g., using positioning signals from a GNSS or a terrestrial positioning system). Then, at step 1013b, the altitude of the three-dimensional estimated position is used as the estimated altitude of the mobile device.

Figure 11:
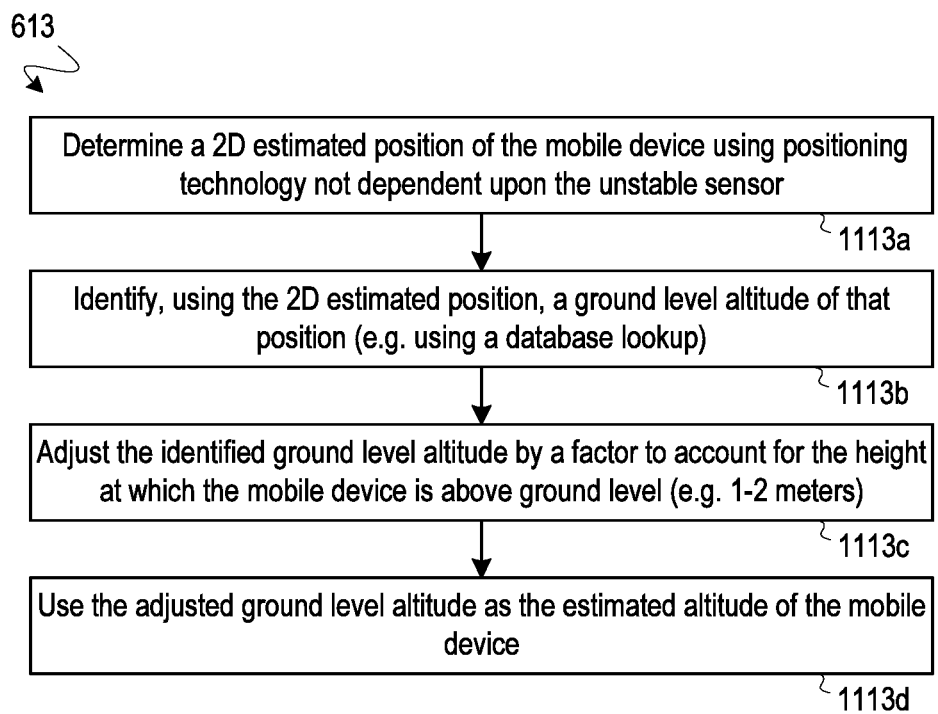
FIG. 11 illustrates another process for determining an estimated altitude of a mobile device using positioning technology that is not dependent upon an unstable sensor.

Another implementation of step 613 for determining an estimated altitude of the mobile device using positioning technology that is not dependent upon a measurement from an unstable sensor includes sub-steps provided in FIG. 11. As shown at step 1113a, a two-dimensional estimated position of the mobile device is determined using positioning technology that is not dependent upon a measurement from the unstable sensor. In one implementation of step 1113a, latitude and longitude are estimated using positioning signals from a GNSS or a terrestrial positioning system. Then, at step 1113b, an altitude is identified using the two-dimensional estimated position. In one implementation of step 1113b, a ground-level altitude that is associated with the two-dimensional estimated position is identified from storage, or a ground-level altitude that is associated with a geographical region that includes the two-dimensional estimated position is identified from storage. The identified altitude may be optionally adjusted at step 1113c by a factor to account for the height at which the mobile device is assumed to be above the identified altitude (e.g., 1-2 meters above the ground-level altitude). The identified altitude or the identified altitude adjusted by the factor is then used as the estimated altitude of the mobile device at step 1113d.

Determining a First Estimated Position of the Mobile Device Using Positioning Technology that is not Dependent Upon a Measurement from the Unstable Sensor (Step 310

Figure 12:
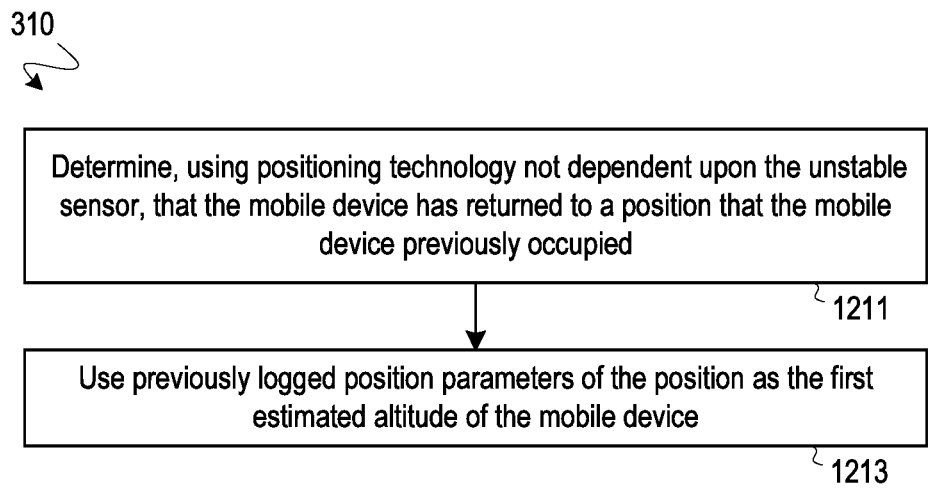
FIG. 12 illustrates a process for determining an estimated position of a mobile device using positioning technology that is not dependent upon an unstable sensor.

Another implementation of step 310 for determining a first estimated position of the mobile device using positioning technology that is not dependent upon a measurement from an unstable sensor includes sub-steps provided in FIG. 12.

Certain embodiments of FIG. 12 are useful for determining when the mobile device has returned to certain "known" 3D locations at which the mobile device frequently resides (e.g., a table or desk at a home or office, a coffee shop, a vehicle during a commute or other locations). The known locations may also be referred to as "return locations", "common locations", or "revisit zones." The revisit zones can be initially identified by computing estimated 2D horizontal positions using positioning signals from GNSS or terrestrial transmitters, by computing estimated altitudes using a calibrated pressure sensor, by detecting the location using signals of a local area network to which the mobile device is connected, or by other approaches. Such known 3D locations are, thus, identified by their 2D horizontal position and their altitude by whatever means are available.

When a mobile device is first activated for use, pressure and inertial sensors have been previously accurately calibrated at the factory or in a laboratory. Alternatively, either upon activation or at any time subsequent thereto, the mobile device might sometimes be located at or near a location for which the altitude is well-known, so the pressure sensor of the mobile device can be accurately calibrated with respect to the well-known altitude. In either of these situations, the pressure sensor's absolute accuracy, or absolute calibration value, can be determined. In any of these situations in which the pressure sensor of the mobile device has been accurately calibrated, the pressure sensor will thereafter produce measurements that are considered to be reliably within a tolerated threshold value from true circumstances over a period of time until the drift of the sensors cause measurements that are no longer within the tolerated threshold value from true circumstances. The typical time period during which the pressure sensor can be considered to produce reliable measurements can vary from several days to several weeks or longer, depending on the quality of the pressure sensor. During this time period, estimated positions of the mobile device can be reliably determined using measurements from the sensor. Additionally, position parameters (e.g., latitude, longitude and/or altitude) of the estimated positions can be stored in association with events, things, and/or conditions that exist or occur when the measurements are made. Furthermore, during this time period, the mobile device may frequently return to some of the certain revisit zones mentioned above.

By way of example, a known location (e.g., altitude) at which the mobile device frequently resides can be identified using pressure measurements from a calibrated pressure sensor to determine multiple estimates of the mobile device's altitude over a time period during which the sensor is considered to be accurately calibrated. Additionally, the determined altitude of the mobile device can be correlated with the 2D horizontal position of the mobile device to properly identify times when the mobile device has returned to any of the revisit zones. The mobile device also identifies particular times of day during which the measurements were made, and stores each of the particular times of day in association with the respective estimated position that was determined using the measurements made at that time of day. Each time of day may also be stored in association with the measurements made at that time of day. Estimated positions that are within a threshold distance (e.g., x units of measurement) from each other are identified as being at the same revisit zone—e.g., the threshold distance may be 1-3 meters of altitude and 1-50 meters of horizontal distance. Alternatively, estimated positions that are within the same building footprint may be identified as being at the same revisit zone.

The times of day associated with the identified estimated positions are also identified. Furthermore, a set of identified times of day that are within a threshold amount of time are identified—e.g., the threshold amount of time may be a range of time of size t (e.g., t=60 minutes), or may be times of day after a particular time of day T (e.g., T=7:30 PM). If the number of times of day in the identified set exceeds a threshold value N, then a known position is determined using the estimated positions associated with the identified times of day in the set. In one embodiment, the known position is the most common of, an average of, or a mean of the estimated positions associated with the identified times of day in the set. The known position is stored in association with a range of times containing the identified times of day in the set. In one embodiment, after a current time of day is determined to fall within the range of times containing the identified times of day in the set, the first estimated position of the mobile device is set to the known position associated with the range of times.

By way of another example, measurements from a calibrated sensor of the mobile device (e.g., pressure measurements from a calibrated pressure sensor) are made during a time period and used to determine multiple estimates of the mobile device's position (e.g., altitude). The estimated positions, measurements and times of day when the measurements were made are stored for later use. When the time period ends, the estimated positions and associated measurements are separated into different bins defined by times of day (e.g., a first bin for estimated positions determined using measurements made between time A and time B, a second bin for estimated positions determined using measurements made between time B and time C, and so on). Each bin is evaluated to determine different densities of the estimated positions that are within a threshold distance from each other (e.g., $n_1$ estimated positions within the threshold distance from each other, $n_2$ estimated positions within the threshold distance from each other, and so on). Densities with $n_\#$ estimated positions greater than a threshold number N of estimated positions are identified as known positions, and the measurements used to compute those estimated positions are identified as known measurements.

As shown at step 1211 of FIG. 12, positioning technology that is not dependent upon a measurement from the unstable sensor is used to determine that the mobile device has returned to a position that the mobile device previously occupied. During step 1211, previously logged data associated with the position that the mobile device previously occupied is identified for comparison to current data from the mobile device. Determining that the previously logged data and the current data matches based on the comparison may occur when the previously logged data and the current data are the same, are within a predefined threshold value of each other, or the current data is within a range of data specified by the previously logged data.

When the previously logged data and the current data are determined to match, position parameters that are associated with the previously logged data are determined to be the first estimated position at step 1213. The position parameters may include latitude, longitude and/or altitude of the position the mobile device previously occupied.

In various implementations of FIG. 12, the previously logged data and the current data may specify:
 (a) an event, including (i) indications from the mobile device that the mobile device's battery was/is charging, (ii) indications from the mobile device that the mobile device's battery capacity is changing at a particular rate (e.g., a rate associated with a charging cable used at a known location or revisit zone, a rate above a positive threshold value so as to indicate increasing capacity indicative of a battery charging status, or a rate below the positive threshold value so as to indicate decreasing capacity indicative of no battery charging status), (iii) indications that the mobile device had/has not moved as determined based on measurements from an inertial sensor indicating no movement, (iv) indications that the mobile device had/has not moved as determined based on a series of estimated positions that are within a threshold distance from each other (e.g., <1 meter, or other distance), (v) indications that the mobile device is connected to a local area network like a W-Fi network, or (vi) indications that the mobile device had/has not moved as determined based on detecting a battery charging status;
 (b) a thing, including (i) sensed images from a camera of the mobile device (e.g., an image may include one or more light levels, one or more colors, and/or one or more shapes, as is known in the art), (ii) sensed audio from a microphone of the mobile device, or (iii) identifiers of a beacon or network from which signals were/are received by the mobile device; and/or
 (c) a condition, including (i) a time of day, (ii) a time or time period during which an event had/has occurred or a thing had/has been identified, (iii) one or more indications of movement by the mobile device or presence of the mobile device at other positions prior to when an event had/has occurred or when a thing had/has been identified, or (iv) estimated latitude and longitude.

These events, things, or conditions may provide an indication or confidence that the mobile device has indeed returned to a revisit zone since they may be understood to exist or occur at the same 3D location each time.

Details for certain implementations of step 1211 are discussed below with reference to FIG. 13 and FIG. 14.

When determining measurement errors for pressure sensors, knowledge of the true altitude of the mobile device at a given time is not required. Instead, recognizing when the mobile device has returned to the same location it has previously occupied when making a measurement with a calibrated sensor can be used. If previous measurements by the pressure sensor were made when the pressure sensor was calibrated and therefore had error below a threshold value, differences between those previous measurements (e.g., an average or other combination of those previous measurements) and a current measurement is the sensor error accumulated from drift of the pressure sensor.

By way of example, pressure measurements from a calibrated pressure sensor are made during a time period before drift exceeds a threshold value, i.e., before a prior absolute calibration value determination has aged to the point of being less reliable or having a lower confidence or higher uncertainty or calibration value confidence. The measurements and times of day when the measurements were made are stored for later use. When the time period ends, the measurements are separated into different bins defined by times of day (e.g., a first bin for measurements made between time A and time B, a second bin for measurements made between time B and time C, and so on). Each bin is evaluated to determine different densities of measurements that are within a threshold value from each other (e.g., $n_1$ measurements within the threshold value, $n_2$ measurements within the threshold value, and so on). Densities with $n_\#$ measurements greater than a threshold number N of measurements are identified as known measurements made at the same location. When a current measurement is made during a time period that corresponds to the known measurements, the difference between the known measurements (e.g., an average or other combination of the known measurements) and a current measurement is the sensor error accumulated from drift of the pressure sensor. This difference can be used as a calibration value.

In alternative embodiments to those described in the preceding paragraphs of this section, the times of day are replaced by detected events, things or other conditions (e.g., detecting a rate of change in a battery's capacity that matches a known rate of change associated with a revisit zone or known measurements).

Determining that the Mobile Device has Returned to a Position that the Mobile Device Previously Occupied (Step 1211

Figure 13:
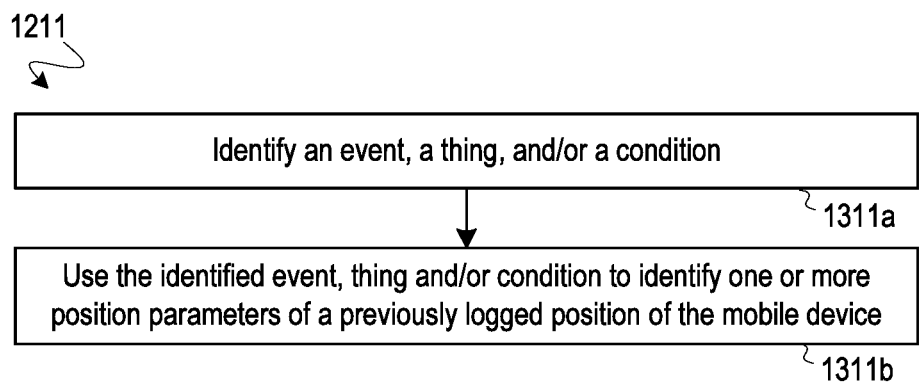
FIG. 13 illustrates a process for using positioning technology that is not dependent upon an unstable sensor to determine that a mobile device has returned to a position that the mobile device previously occupied.

One implementation of step 1211 for using positioning technology that is not dependent upon a measurement from the unstable sensor to determine that the mobile device has returned to a position that the mobile device previously occupied includes sub-steps provided in FIG. 13.

As shown at step 1311*a*, an event, a thing and/or a condition for a current position of the mobile device is received, detected or otherwise identified. Events, things and conditions may include the events, things and conditions described previously.

At step 1311*b*, the identified event, thing and/or condition is used to identify previously logged events, things and conditions that are associated with one or more position parameters of a previously logged ("stored") position of the mobile device, where those position parameters are returned from storage for use as the first estimated position.

In a first embodiment of step 1311*b*, an identified event, thing or condition may be used to query stored values of previously logged events, things or conditions. If, during the query, the identified event, thing or condition is determined to match a stored value of a previously logged event, thing or condition that is associated with one or more position parameters, then those position parameters are returned for use as the first estimated position. If, during the query, the identified event, thing or condition is determined to not match the stored value of a previously logged event, thing or condition, then position parameters are not returned for use as the first estimated position. Determining that an identified event, thing or condition and the previously logged event, thing or condition matches may occur when the identified event, thing or condition and the logged event, thing or condition are the same, or are within a threshold value from each other.

In one implementation of the first embodiment of step 1311*b*, the mobile device identifies a time period on a first day during which a measurement from the unstable sensor is measured for use in generating the second estimated position. By way of example, the time period may be selected from one or more predefined time periods, or may be identified during the occurrence of an event (e.g., when a battery status indicates the mobile device's battery is charging). The time period may be used to query a local memory or an external database for a stored position that is associated with the time period (e.g., associated with a stored indication of the time period). The stored position may include an estimate of a position the mobile device was at during the time period on a second day that preceded the first day. If needed, the mobile device receives the stored position from the storage module. Then, the mobile device determines that the first estimated position is the stored position. The time period may be identified as a time period during which one or more previously logged positions were determined while the mobile device was located at the same location (e.g., at home, at work or school, at another routinely visited location, or at a piece of furniture). For example the time period could be: (a) a time period (e.g., 12 a.m. to 3 a.m.) during which the mobile device does not move because the user of the mobile device is sleeping; (b) a time period (e.g., 10 a.m. to 11 a.m., 2 p.m. to 3 p.m.) during which the mobile device moves within a threshold range of distance (e.g., <1 meter) because the user of the mobile device is working at his or her desk and the mobile device is at most moved to different parts of the desk; (c) a time period (e.g., 6 a.m. to 7 a.m., 5 p.m. to 6 p.m.) during which the mobile device does not move because the user of the mobile device is performing a routine task (e.g., exercising, attending a meeting, eating a meal); or (d) another time period during which the mobile device has routinely been located at a particular location.

In another implementation of the first embodiment of step 1311*b*, the mobile device records its movement. By way of example, the mobile device may record measurement(s) of an inertial sensor, or may record a set of chronological estimated positions. A determination is made as to whether the recorded movement matches one or more stored values of previous movement by the mobile device. By way of example, recorded measurement(s) of the inertial sensor and previously recorded measurement(s) of the inertial sensor may be compared, and a determination is made that the measurements match when they are the same or within a predefined threshold value of each other. Alternatively, a recorded set of chronological estimated positions and a previously recorded set of chronological estimated positions may be compared, and a determination is made that they match when corresponding estimated positions of the two sets are the same or within a predefined threshold distance of each other. The mobile device identifies a previously logged position that is associated with the stored value(s) of previous movement by the mobile device. By way of example, the stored value(s) of previous movement by the mobile device are used to query a local memory or an external database for a stored position that is associated with the stored value(s) of previous movement by the mobile device. The stored position may include an estimate of a position the mobile device arrived at after the stored value(s) of movement were recorded (e.g., a position of the mobile device after it traveled from the user's work to the user's home, or vice versa). If needed, the mobile device receives the stored position from the storage module. Then, the mobile device determines that the first estimated position is the stored position.

In yet another implementation of the first embodiment of step 1311*b*, the mobile device determines that an event has occurred, such as when the mobile device connects to a local area network like a W-Fi network that it remains connected to when a measurement from the unstable sensor is measured for use in generating the second estimated position. An identifier of the local area network obtained by the mobile device may be used to query a local memory or an external database for a stored position that is associated with the local area network (e.g., associated with a stored indication of the identifier). The stored position includes an estimate of a position the mobile device was at when the mobile device was previously connected to the local area network, or it includes one or more position coordinates assigned to the local area network. If needed, the mobile device receives the stored position from the storage module. Then, the mobile device determines that the first estimated position is the stored position. The local area network may be a home network, a work or school network, or a network of another location at which the mobile device was previously located when an estimate of that mobile device's position was determined and later logged in the storage module.

In yet another implementation of the first embodiment of step 1311*b*, a camera of the mobile device captures a first image (e.g., by activating the camera in response to instructions from an application that is running on the mobile device). A second image that matches the first image is identified from a local memory or an external database, which may result from comparing the first image to the second image, and determining that the first image and the second image match using known techniques for matching images. The second image may be used to query a local memory or an external database for a stored position that is associated with the second image (e.g., associated with an indication of the second image). The stored position may include an estimate of a position the mobile device was at when the camera of the mobile device captured the second image. If needed, the mobile device receives the stored position from the storage module. Then, the mobile device determines that the first estimated position is the stored position.

In a second embodiment of step 1311*b*, an identified event or thing and an identified condition may be used to query stored values of previously logged events or things and previously logged conditions. If, during the query, the identified event or thing and the identified condition are determined to match stored values of a previously logged event or thing and an associated condition, then position parameter(s) that are associated with the previously logged event or thing and associated condition are returned for use as the first estimated position. If, during the query, the identified event or thing and the identified condition are determined to not match stored values of a logged event or thing and the associated condition, then position parameter(s) are not returned for use as the first estimated position. Determining that identified event or thing and associated condition and the previously logged event or thing and associated condition match may occur when the identified event or thing and the previously logged event or thing are the same or are within a threshold value from each other, and when the identified condition and the previously logged condition are the same or are within a threshold value from each other.

In one implementation of the second embodiment of step 1311b, the mobile device identifies an event or a thing, and computes an initial estimated position of the mobile device (e.g., using positioning technology that is not dependent upon the unstable sensor). The mobile device identifies a previously logged position that is within x units of measurements from the initial position (e.g., within <1 meter, <2 meters, or another value for x), or that is in an area that includes the initial estimated position (e.g., by looking up the previously logged position from a local memory or an external database). A previously logged event or thing that is stored in association with the previously logged position may be identified. The previously logged event or thing may be compared with the identified event or thing to determine if they match (e.g., are the same, or are within a threshold value from each other). If they match, then the mobile device determines that the first estimated position is the previously logged position.

In another implementation of the second embodiment of step 1311b, the mobile device determines that its battery is charging on a first day. After determining that its battery is charging, the mobile device identifies a time period during which the battery is charging. The time period may be used to query a local memory or an external database for a stored position that is associated with the time period (e.g., associated with a stored indication of the time period). The stored position may include an estimate of a position the mobile device was at when a battery of the mobile device was charging during the time period on a second day that preceded the first day. If needed, the mobile device receives the stored position from the storage module. Then, the mobile device determines that the first estimated position is the stored position.

In a third embodiment of step 1311b, an identified event and an identified thing may be used to query stored values of previously logged events and associated things. If, during the query, the identified event and thing are determined to match stored values of a previously logged event and thing, then position parameter(s) that are associated with the previously logged event and thing are returned for use as the first estimated position. If, during the query, the identified event and thing are determined to not match the stored values of the previously logged event and thing, then the position parameter(s) that are associated with the previously logged event and thing are not returned for use as the first estimated position. Determining that identified event and thing and the previously logged event and thing match may occur when the identified event and the previously logged event are the same or are within a predefined threshold value of each other, and when the identified thing and the previously logged thing are the same or are within a threshold value from each other.

In one implementation of the third embodiment of step 1311b, an event (e.g., a detected status indicating the battery of the mobile device is charging) and a thing (e.g., an external input captured by a camera of the mobile device, or an identifier of a beacon) are identified. The identified event is used to query storage for a matching stored value of that event (e.g., a previously detected status indicating the battery of the mobile device was charging). The matching stored value of the event is used to look up a stored value of the thing that is associated with the stored value of the event. The identified thing is compared to the stored value of the thing that was looked up, and position parameter(s) associated with the stored value of the event and/or the stored value of the thing are returned for use as the first estimated position when the identified thing and the stored value of the thing match. Of course, a condition could replace the thing or the event, a thing could replace the event, and/or an event could replace the thing in other implementations. Optionally, an estimated position of the mobile device may be determined using positioning technology that is not dependent upon a measurement from the unstable sensor, and that estimated position may replace the event or the thing.

Determining that the Mobile Device has Returned to a Position that the Mobile Device Previously Occupied (Step 1211

Figure 14:
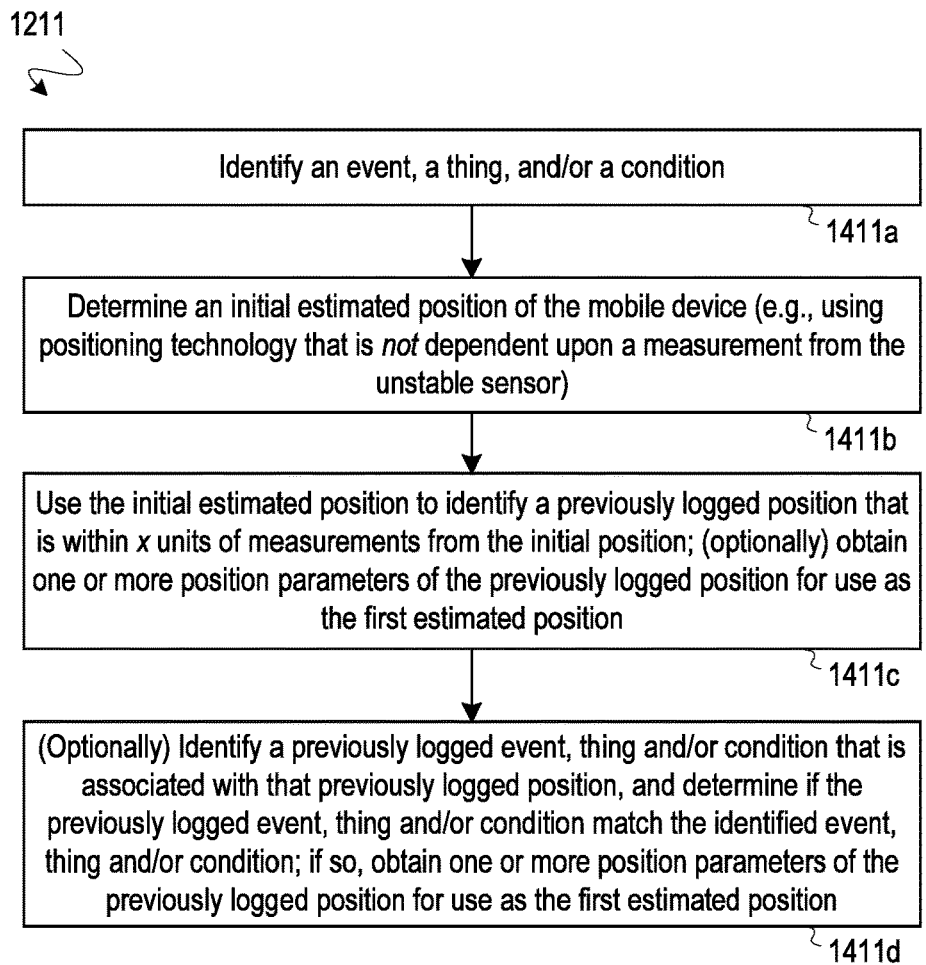
FIG. 14 illustrates another process for using positioning technology that is not dependent upon an unstable sensor to determine that a mobile device has returned to a position that the mobile device previously occupied.

Another implementation of step 1211 for determining that the mobile device has returned to a position that the mobile device previously occupied using positioning technology that is not dependent upon a measurement from an unstable sensor includes sub-steps provided in FIG. 14.

As shown at step 1411a, an event, a thing, and/or a condition are identified. Such an event, a thing, and/or a condition may be identified as they were identified in the embodiments related to FIG. 13.

At step 1411b, an initial estimated position of the mobile device is determined (e.g., using positioning technology that is not dependent upon a measurement from the unstable sensor). In some embodiments of FIG. 14, step 1411b is triggered only after particular events, things and/or conditions are identified. For example, the initial estimated position may be determined in response to detecting that a battery of the mobile device is charging, detecting that the capacity of a battery changing at a particular rate, detecting the mobile device has connected to a particular local area network, detecting the current time is within a predefined time period, and/or detecting some other event, thing, or condition. In other embodiments of FIG. 14, step 1411b may occur before any event, thing and/or condition is identified in step 1411a.

At step 1411c, the initial estimated position is used to identify a previously logged position that is within x units of measurements from the initial position (e.g., within 1 meter, 2 meters, or another value for x), or that is in an area that includes the initial estimated position. By way of example, the previously logged position may be identified by looking up the previously logged position from a local memory or an external database and confirming it is within x units of measurements from the initial position, or within an area that includes the initial estimated position.

At optional step 1411d, the previously logged may be used to identify a previously logged event, thing and/or condition that is associated with that previously logged position, and a determination is made as to whether the previously logged event, thing and/or condition match the identified event, thing and/or condition. When the previously logged event, thing and/or condition matches the identified event, thing and/or condition, one or more position parameters of the previously logged position are obtained for use as the first estimated position. When the previously logged event, thing and/or condition does not match the identified event, thing and/or condition, a determination may be made that the mobile device has not returned to the previously logged position.

Calibrating the Unstable Sensor Using the Determined Sensor Error (Step 390

Figure 15:
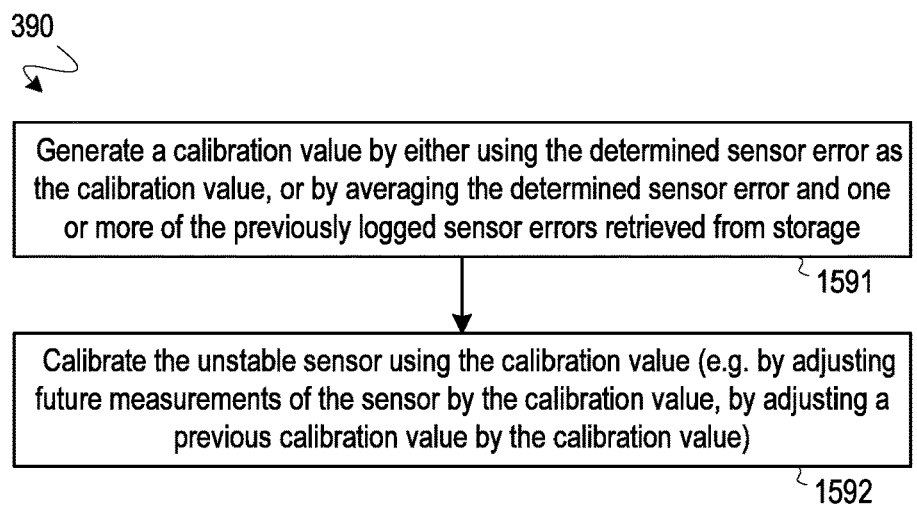
FIG. 15 illustrates a process for calibrating an unstable sensor using determined sensor error and optionally previously logged sensor errors.

An implementation of step 390 for calibrating the unstable sensor using the determined sensor error includes sub-steps provided in FIG. 15. As shown, a calibration value is determined at step 1591 by either using the determined sensor error as the calibration value, or by setting the calibration value to an average of the determined sensor error and one or more of the previously logged sensor errors. Then, the unstable sensor is calibrated at step 1592 using the calibration value (e.g., by adjusting future measurements of the sensor by the calibration value, or by adjusting a previous calibration value by the calibration value). In some embodiments, adjustment is by subtraction or addition dependent on whether measurements of circumstances before calibration are above or below true values of the circumstances.

A step of determining which sensor is the unstable sensor could also be performed before step 1591—e.g., by detecting measurement errors from the sensor, or by detecting when an estimated position computed using a measurement from the sensor has an error relative to the true position that exceeds a tolerated level of error (e.g., <1 m, <2 m, or another value). Detection of a measurement error for an inertial sensor may be accomplished by identifying a measurement from the inertial sensor that indicates movement of the mobile device when the mobile device is not actually moving. Detection of a measurement error for a pressure sensor (or detection of when an estimated position computed using a measurement from the pressure sensor has an error relative to the true position) may be accomplished by computing an estimated altitude using a measurement of pressure from the pressure sensor, and then determining that the estimated altitude is not equal to (or within a threshold value of) true altitude, where true altitude is determined as described elsewhere herein (e.g., is an altitude previously occupied by the mobile device).

In one implementation of step 1592 when the sensor is a pressure sensor, the determined calibration value is subtracted from future measurements of the sensor where the sensor measurements are found to be higher than true pressure, and the determined calibration value is added to future measurements of the sensor where the sensor measurements are found to be lower than true pressure. In another implementation of step 1592 when the sensor is a pressure sensor, the determined calibration value is subtracted from the previous calibration value where calibrated sensor measurements are found to be higher than true conditions, and the determined calibration value is added to the previous calibration value where calibrated sensor measurements are found to be lower than true conditions.

Figure 16:
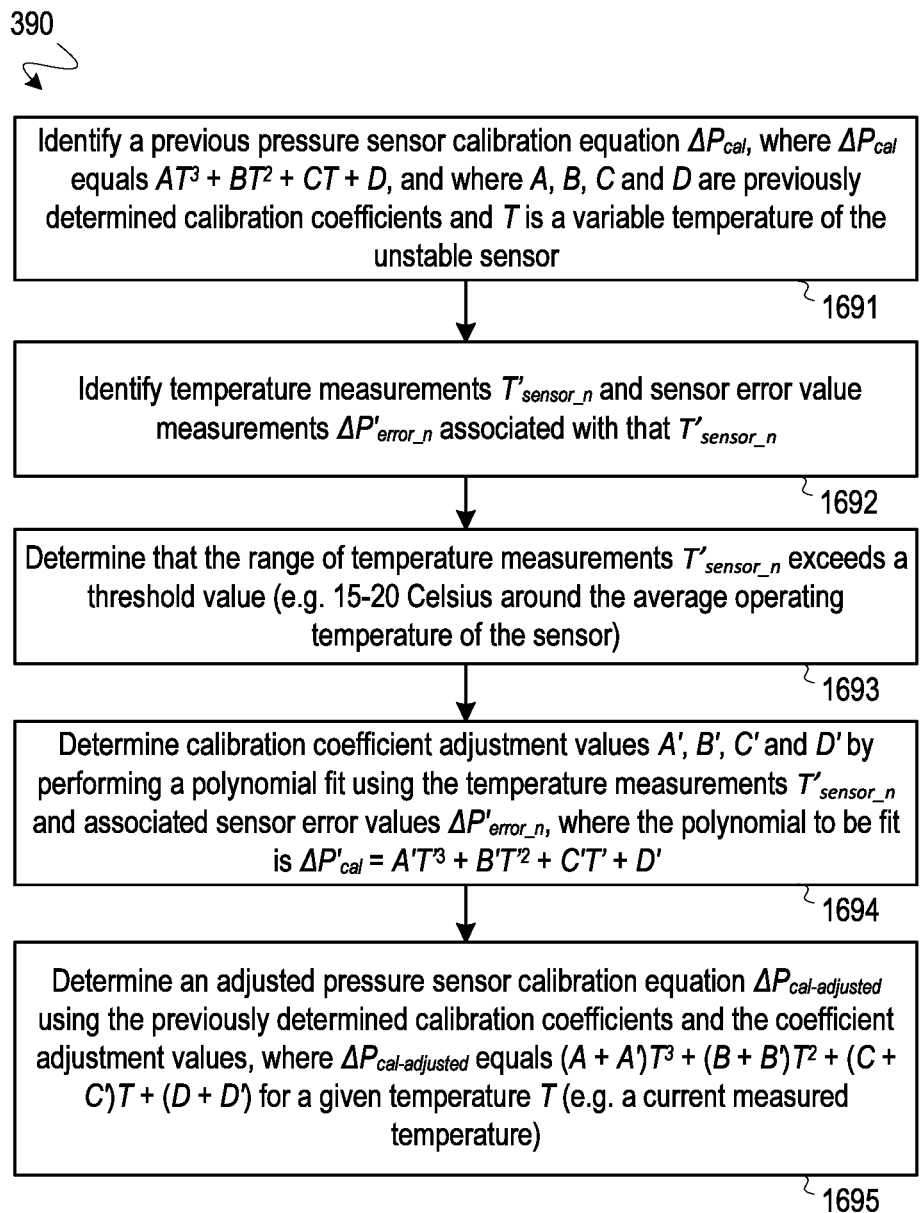
FIG. 16 illustrates another process for calibrating an unstable sensor using determined sensor error and previously logged sensor errors, and optionally using a temperature measurement and previously logged temperature measurements.

Another implementation of step 390 of FIG. 3 for calibrating the unstable sensor using the determined sensor error includes sub-steps provided in FIG. 16. As shown, a previous pressure sensor calibration equation $\Delta P_{cal}$ is identified at step 1691—e.g., where $\Delta P_{cal}$ is an equation equal to $AT^3+BT^2+CT+D$, where A, B, C and D are calibration coefficients that were previously determined during a factory calibration of an unstable pressure sensor using a thermal chamber or another approach, and where T is a given temperature of the unstable pressure sensor. The equation of step 1691 is only one example of an equation. In other embodiments, other equations may be used. For example, alternative embodiments of $\Delta P_{cal}$ are described in U.S. Pub. No. 20150127287, published May 7, 2015, entitled DETERMINING CALIBRATED MEASUREMENTS OF PRESSURE FOR DIFFERENT SENSORS. Other equations for other embodiments are also possible.

Figure 17:
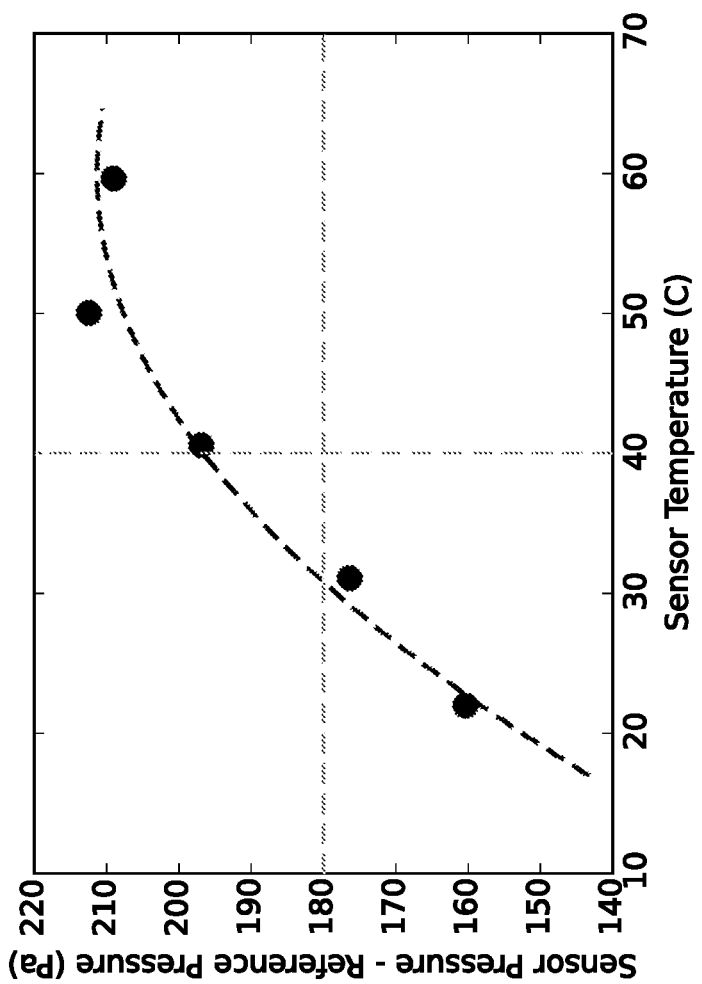
FIG. 17 depicts a polynomial fit of sensor errors as a function of sensor temperature.

In one embodiment for determining the equation of step 1691, different pressure errors were computed as $\Delta P_{error\_n}=P_{sensor\_n}-P_{reference\_n}$, where $P_{sensor,n}$ is a measurement of pressure by a pressure sensor of the mobile device at an altitude n and $P_{reference\_n}$ is an accurate estimate of true pressure at that particular altitude n. A temperature $T_{sensor,n}$ of the pressure sensor was also measured when $P_{sensor,n}$ was measured. The pressure sensor calibration equation $\Delta P_{cal}$ is determined using a polynomial fit of the individual sensor errors $\Delta P_{error\_n}$ as a function of the measured sensor temperature $T_{sensor,n}$. Fitting the polynomial curve to combinations of errors $\Delta P_{error\_n}$ and $T_{sensor,n}$ is an example of determining the coefficient values A, B, C and D. An example of a polynomial fit of individual sensor errors as a function of a corresponding measured sensor temperature is depicted in FIG. 17.

As step 1692 of FIG. 16, the receiver identifies temperature measurements $T'_{sensor,n}$ of the pressure sensor and corresponding sensor error value measurements $\Delta P'_{error\_n}=P'_{sensor\_n}-P'_{reference\_n}$, where $P'_{sensor,n}$ is a measurement of pressure by a pressure sensor of the mobile device at an altitude n and $P'_{reference\_n}$ is an accurate estimate of true pressure at that particular altitude n. Each of the temperature measurements $T'_{sensor\_n}$ was measured when the pressure sensor made a corresponding measurement of pressure $P'_{sensor\_n}$ that was used to determine a corresponding sensor error value measurement $\Delta P'_{error\_n}$. In at least one embodiment, each of $T'_{sensor,n}$, $P'_{sensor\_n}$, and $P_{reference\_n}$ were measured or estimated after $\Delta P_{cal}$ was determined.

At optional step 1693, a determination is made as to whether the range of temperature measurements $T'_{sensor,n}$ have exceeded a threshold value (e.g., 15-20 Celsius around the average operating temperature of the unstable sensor), and if the threshold value is exceeded, a decision is made to determine calibration coefficient adjustment values.

At step 1694, calibration coefficient adjustment values A', B', C' and D' are determined by performing a polynomial fit using the temperature measurements $T'_{sensor,n}$ and associated sensor error values $\Delta P'_{error\_n}$, where the polynomial that is to be fit is $\Delta P'_{cal}=A'T'^3+B'T'^2+C'T'+D'$ for a given temperature T' of the pressure sensor. The polynomial fit of step 1694 is only one example of a polynomial fit. In other embodiments, other polynomial fits may be used.

At step 1695, an adjusted pressure sensor calibration equation $\Delta P_{cal-adjusted}$ is then determined using the previously determined calibration coefficients and the coefficient adjustment values, where $\Delta P_{cal-adjusted}=(A+A')T^3+(B+B')T^2+(C+C')T+(D+D')$ for a given temperature T of the pressure sensor (e.g., a new measured temperature of the unstable sensor). Depending on the circumstances, A', B', C' and D' can be positive or negative in value.

A polynomial fit of sensor errors as a function of sensor temperature is depicted in FIG. 17. Each of the sensor errors is based on a difference between a measurement of pressure at a particular altitude by the unstable sensor and a measurement or estimate of the true pressure for the particular altitude (e.g., as measured by a calibrated accurate sensor, or as estimated based on a measurement from a calibrated accurate sensor located at a different altitude). As shown, a polynomial curve (shown as a dashed line) is fit to points (shown as large black dots) defined by sensor error (in Pa) as a function of sensor temperature (in degrees C.). Fitting the polynomial curve is an example of determining the calibration coefficient values A, B, C and D, or the calibration coefficient adjustment values A', B', C' and D'.

In one embodiment, the calibration value is simply D, where any pressure error at any temperature is averaged to a fixed value. If, in other embodiments over a range of temperatures, a temperature measurement of the unstable sensor is collected each time a sensor error for the unstable sensor is determined, coefficient adjustment values may be determined, and the calibration value is not simply D, but instead $\Delta P_{cal}$ or $\Delta P_{cal\text{-}adjusted}$. Temperatures in the temperature range might include a cool temperature from the mobile device being left outside at a revisit zone, a warm temperature from the mobile device being warmed at a revisit zone due to a high processor rate that drives the internal temperature, and other temperatures.

Calibrating an Unstable Sensor Based on Revisiting Revisit Zones

In some embodiments in which the calibration value is determined based on revisiting one or more revisit zones, the revisit zone's true altitude might not be known or determinable (e.g., the true altitude might be ambiguous due to the 2D position or location being within a building having multiple floors and the mobile device potentially being on any of the floors). In this situation, the absolute calibration value cannot be determined to provide floor-level accuracy. Nevertheless, pressure measurements taken by the pressure sensor of the mobile device during repeated visits to such a revisit zone can be used in conjunction with a prior absolute accuracy determination in order to calculate an updated or adjusted absolute calibration. This has the advantage of capitalizing on data collected indoors, even though it is collected at an ambiguous or unknown altitude. In addition, the repeat-visit measurement data can be analyzed to screen for and filter out anomalous data that was improperly clustered or labeled, which can be discarded before performing the calibration calculations, so as to improve the calculation result or reliability.

Repeat-visit measurement data is defined as data collected at a location that is repeatedly visited by the mobile device at different times. Identification of a revisit zone (and revisits or repeat-visits thereto) can be done in a variety of ways. In some embodiments, for example, a revisit zone can be identified when the battery of the mobile device is periodically charged, which typically occurs at the same location, e.g., on the user's bedside table at night or on the user's desk during the day. In some embodiments, a revisit zone can be identified using a global navigation satellite system (GNSS), such as a global positioning system (GPS). In some embodiments, the location of a revisit zone need not be determined to be the exact same 2D position at each time data is collected, but within a reasonable 2D threshold (e.g., within 50 m, or within the same building footprint) or within an altitude threshold (e.g. 3 m). A determination that a location is within the 2D and altitude thresholds of the revisit zone can be a sufficient indication that the location is likely to be about the same as the revisit zone, or a location footprint that overlaps with a footprint of a building that the mobile device appears to repeatedly visit may indicate a revisit zone. In some embodiments, a revisit zone can be identified when the mobile device connects to the same WiFi access point as previously connected, since WiFi access points typically do not change location. In general, various hardware and techniques of the mobile device can be used to identify or determine a revisit zone and revisits or repeat-visits thereto.

Additionally, the repeat-visit measurement data may be collected in brief bursts (e.g. several minutes or one or more hours) over an extended period of time (e.g. several days or weeks or one or more months). Each data point collected may be referred to herein as an individual "fix", and the fixes collected during a brief burst may be referred to herein as a "cluster". Additionally, a cluster may imply that the data fixes are close to each other in value, as well as in time and location. One or more clusters of data may be collected during any given period of time. Assuming the repeat-visit location is fixed in altitude, the data collected for two or more clusters during this time can be used to adjust the calibration value to account for any drift experienced by the pressure sensor since the beginning of the repeat visits. Clustering of altitude-determination data is described in U.S. patent application Ser. No. 16/364,827, which is assigned in common with the present application, and which is incorporated herein as if set forth fully herein.

In some embodiments, the revisit zone is indoors, e.g., at the user's home or office. Data collected indoors, however, can also be prone to artificial pressurization from a building's HVAC system, where the pressure at an altitude differs from external ambient pressure at the same altitude by an offset. However, data calculated at such a revisit zone would generally always be biased by about the same amount, so any "relative" change measured would not contain such a bias. Thus, the repeat-visit measurement data collected at revisit zones is used to determine such relative changes, which are then used to adjust a previous absolute value, rather than to determine an all-new absolute value.

In some embodiments, a repeat-visit based calibration is performed by adjusting the most recent absolute calibration value (MostRecentAbsoluteCal) by a relative calibration adjustment value (RelativeCalAdjustment) to arrive at an adjusted absolute calibration value (AdjustedAbsoluteCal). The adjusted absolute calibration value is then used as the calibration value for the pressure sensor and any subsequent pressure-based altitude determinations. The most recent absolute calibration value is generally a highly reliable calibration performed relatively shortly before the beginning of the repeat visits. Thus, an initial repeat visit to the revisit zone generally occurs after the determination of the most recent absolute calibration value and within the time period thereafter during which the most recent absolute calibration value is considered to be reliable, so the pressure sensor can be considered to produce reliable calibrated measurements for the initial repeat visit. The relative calibration adjustment value generally represents at least some of the drift of the pressure sensor since the most recent absolute calibration and is generally based on a difference between the repeat-visit measurement data for a cluster of fixes for the initial repeat visit and the repeat-visit measurement data for a cluster of fixes for a subsequent or most recent repeat visit. The adjusted absolute calibration value may thus be greater than or less than the most recent absolute calibration value depending on a positive or negative value of the relative calibration adjustment value. Alternatively, the adjusted absolute calibration value may about equal to the most recent absolute calibration value if no significant drift occurred. The calibration value confidence, i.e., the uncertainty or an altitude error value, for the absolute calibration value generally increases for the adjusted absolute calibration value.

One way to calculate the relative calibration adjustment value (RelativeCalAdjustment) is by determining the difference between a calibration calculation for the repeat-visit measurement(s) of the initial repeat visit (InitialRepeatCal) and a calibration calculation for the repeat-visit measurement(s) of a subsequent or most recent repeat visit (MostRecentRepeatCal), as shown in Equation 1:

$$\text{RelativeCalAdjustment} = \text{MostRecentRepeatCal} - \text{InitialRepeatCal}. \quad \text{Equation 1}$$

The most recent repeat-visit calibration (MostRecentRepeatCal) can be determined from a mean, median, weighted mean, mode, or other appropriate metric of the individual fixes in the cluster for the most recent repeat visit, and the initial repeat-visit calibration (InitialRepeatCal) can be determined from a mean, median, weighted mean, mode, or other appropriate metric of the individual fixes in the cluster for the initial repeat visit.

The adjusted absolute calibration value (AdjustedAbsoluteCal) is calculated by adding on the relative calibration adjustment value (RelativeCalAdjustment) to the most recent absolute calibration value (MostRecentAbsoluteCal), as shown in Equation 2:

$$\text{AdjustedAbsoluteCal} = \text{MostRecentAbsoluteCal} + \text{RelativeCalAdjustment}. \quad \text{Equation 2}$$

Figure 18:
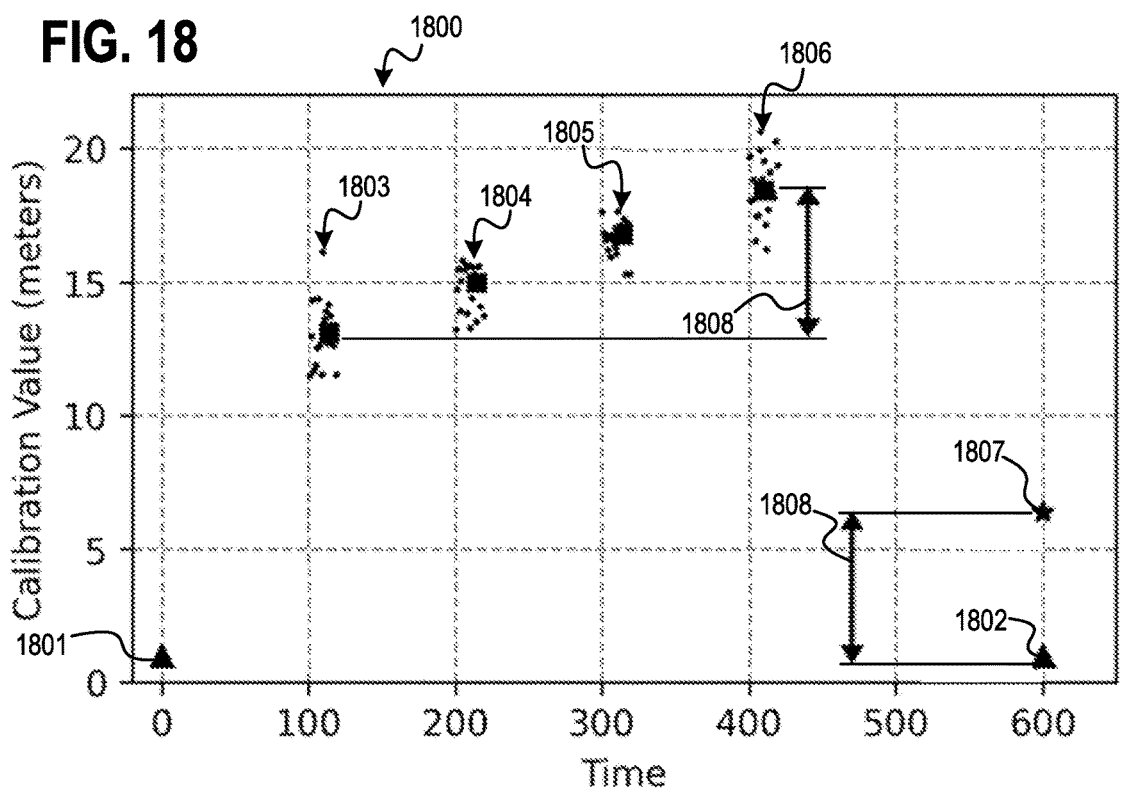

FIG. 18 shows a graph 1800 of example calibration values vs time for data collections during repeat visits to a revisit zone. In this example, an initial absolute calibration value is shown at 1801 (a solid triangle) with a value of about 1 meter, which is also the most recent absolute calibration value (also shown at 1802 by a solid triangle). Four clusters 1803-1806 of data fixes (between about time=100 and about time=420) are shown for repeat visits to the revisit zone following the time point (time=0) at which the initial absolute calibration value at 1801 was determined. The altitude of the revisit zone is not necessarily known, so the calibration values calculated for the data fixes (as shown by the dots) are not necessarily reliable as individual data points. Instead, it is the relative difference in the calibration values between the clusters 1803-1806 that are useful. Additionally, it is the mean, median, weighted mean, mode, or other appropriate metric (shown by solid squares near the middle of the clusters) of the individual fixes in each cluster 1803-1806 that can be used.

For example, for the initial repeat visit (cluster 1803) (a first visit), which occurs within the time period during which the most recent absolute calibration value is considered to be reliable, the mean, median, weighted mean, mode, or other appropriate metric (about 13 m) of the individual fixes is calculated to determine the initial repeat-visit calibration (InitialRepeatCal) (a first calibration). Each of the subsequent clusters 1804-1806 could potentially be used to determine an adjusted absolute calibration value (AdjustedAbsoluteCal). However, for this example, only the most recent repeat visit (cluster 1806) is used to determine the illustrated adjusted absolute calibration value at 1807 (shown by a solid star). (The repeat-visit measurement data that is collected but not directly involved in determining a relative calibration adjustment value, e.g., intermediate data at cluster 1804 or 1805, can be used to run consistency checks and anomaly checks on the revisit zone, or can be used to judge the quality of the revisit zone.) Thus, the mean, median, weighted mean, mode, or other appropriate metric (about 18 m) of the individual fixes of the most recent repeat visit (cluster 1806) (a second visit) is calculated to determine the most recent repeat-visit calibration (MostRecentRepeatCal) (a second calibration). Then the initial repeat-visit calibration (InitialRepeatCal) is subtracted from the most recent repeat-visit calibration (MostRecentRepeatCal) to determine the relative calibration adjustment value (RelativeCalAdjustment), which is shown by double-ended arrows 1808 to be about 5 m. Then the relative calibration adjustment value (RelativeCalAdjustment) is added to the most recent absolute calibration value (MostRecentAbsoluteCal) at 1802 to determine the adjusted absolute calibration value (AdjustedAbsoluteCal) at 1807, which is about 6 m (i.e., 1 m+5 m) and is then used after time=420 to determine the altitude of the mobile device, until a new absolute calibration value can be determined, or another adjusted absolute calibration can be determined.

Figure 19:
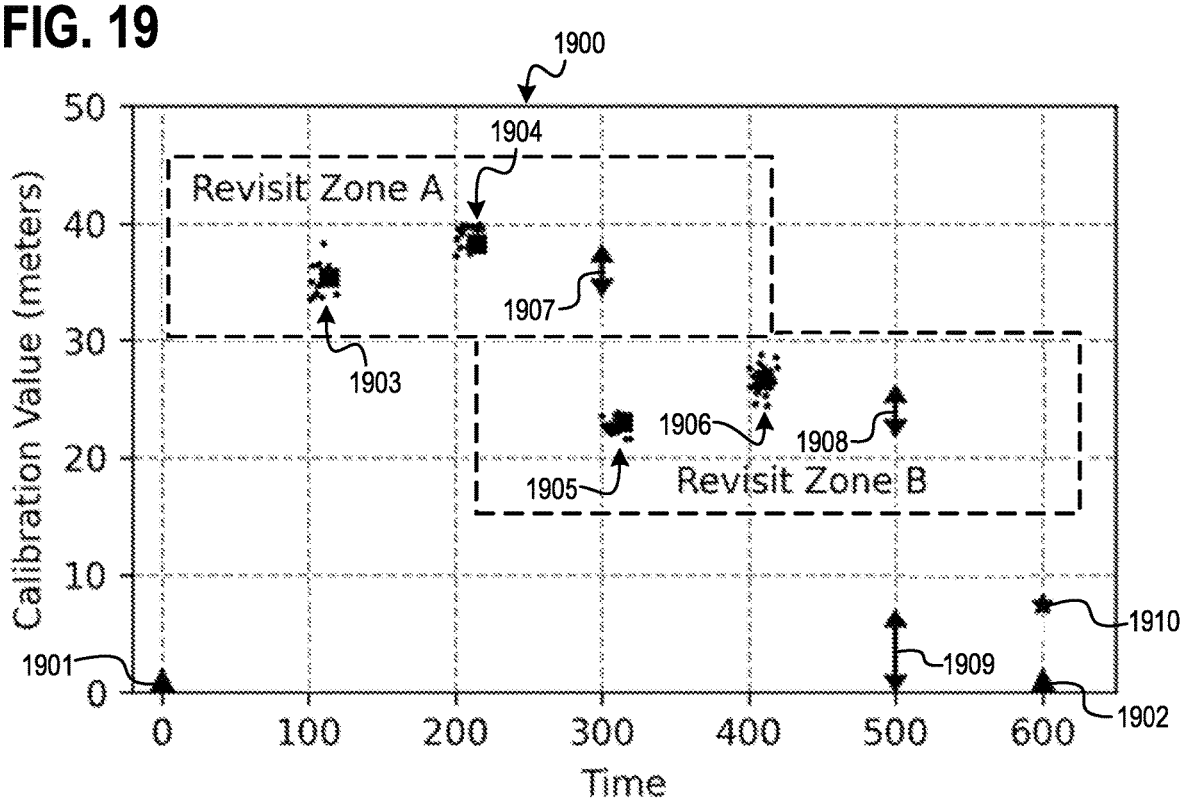

If the mobile device visits more than one revisit zone, then a similar calculation can be used for each revisit zone and then combined to determine an adjusted absolute calibration value (AdjustedAbsoluteCal). FIG. 19 shows a graph 1900 of example calibration values vs time for data collections during repeat visits to two revisit zones, e.g., a first revisit zone A and a second revisit zone B, for which the revisits to the two revisit zones do not overlap in time. In this example, an initial absolute calibration value is shown at 1901 (a solid triangle), which is also the most recent absolute calibration value (also shown at 1902 by a solid triangle). After the initial absolute calibration value has been determined at time=0, the mobile device revisits the first revisit zone A twice to generate cluster 1903 for a first initial repeat visit A and cluster 1904 for a first most recent repeat visit A. After the first most recent repeat visit A for the first revisit zone A, the mobile device revisits the second revisit zone B twice to generate cluster 1905 for a first initial repeat visit B and cluster 1906 for a first most recent repeat visit B. Both of the initial repeat visits A and B occur within the time period during which the most recent absolute calibration value is considered to be reliable.

For the first initial repeat visit A (cluster 1903), the mean, median, weighted mean, mode, or other appropriate metric of the individual fixes is calculated to determine the first initial repeat-visit calibration A (InitialRepeatCalA) for the first revisit zone A. The mean, median, weighted mean, mode, or other appropriate metric of the individual fixes of the first most recent repeat visit A (cluster 1904) is calculated to determine the first most recent repeat-visit calibration A (MostRecentRepeatCalA) for the first revisit zone A. Then the first initial repeat-visit calibration A (InitialRepeatCalA) is subtracted from the first most recent repeat-visit calibration A (MostRecentRepeatCalA) to determine the first relative calibration adjustment value A (RelativeCalAdjustmentA), as shown by double-ended arrow 1907, for the first revisit zone A. For the second initial repeat visit B (cluster 1905), the mean, median, weighted mean, mode, or other appropriate metric of the individual fixes is calculated to determine the second initial repeat-visit calibration B (InitialRepeatCalB) for the second revisit zone B. The mean, median, weighted mean, mode, or other appropriate metric of the individual fixes of the second most recent repeat visit B (cluster 1906) is calculated to determine the second most recent repeat-visit calibration B (MostRecentRepeatCalB) for the second revisit zone B. Then the second initial repeat-visit calibration B (InitialRepeatCalB) is subtracted from the second most recent repeat-visit calibration B (MostRecentRepeatCalB) to determine the second relative calibration adjustment value B (Relative CalAdjustmentB), as shown by double-ended arrow 1908, for the second revisit zone B.

Since the revisits to the two revisit zones A and B do not overlap in time, it may be assumed that the pressure sensor experienced a first amount of drift during the time period that the mobile device revisited the first revisit zone A and a second amount of drift (independent of the first amount of drift) during the time period that the mobile device revisited the second revisit zone B. Therefore, at least some of the total observed drift of the pressure sensor (from the time that the initial absolute calibration value was determined to the time of the second most recent repeat visit B (cluster 1906)) is represented by the sum of the first relative calibration adjustment value A (RelativeCalAdjustmentA) and the second relative calibration adjustment value B (RelativeCalAdjustmentB). This sum (overall relative calibration adjustment value A+B (RelativeCalAdjustmentA+B), as shown by double-ended arrow 1909) is added to the most recent absolute calibration value at 1902 to determine the adjusted absolute calibration value (AdjustedAbsoluteCal) at 1910, which is then used to determine the altitude of the mobile device, until a new absolute calibration value can be determined.

In some embodiments, the mobile device might revisit multiple revisit zones during time periods that overlap with each other in time either partially or completely. In this case, the individual relative calibration adjustment values for each revisit zone are determined as described above, but it is generally not appropriate to simply add the individual relative calibration adjustment values together (as described above for the non-overlap situation) to determine the overall relative calibration adjustment value that is added to the most recent absolute calibration value to determine the adjusted absolute calibration value (AdjustedAbsoluteCal), which is then used to determine the altitude of the mobile device, until a new absolute calibration value can be determined. Instead, the individual relative calibration adjustment values for each revisit zone (e.g., RelativeCalAdjustmentA and RelativeCalAdjustmentB) are combined with appropriate weight values (e.g., $W_A$ and $W_B$) to determine the overall relative calibration adjustment value (RelativeCalAdjustment), as shown for two revisit zones A and B in Equation 3:

$$RelativeCalAdjustment = \frac{RelativeCalAdjustmentA \times W_A + RelativeCalAdjustmentB \times W_B}{W_A + W_B}. \quad \text{Equation 3}$$

In some embodiments, the weight values (e.g., $W_A$ and $W_B$) can be determined based on, for example, 1) the time duration of the data collected during the zones, wherein a longer time duration results in a higher weight value, and a shorter time duration results in a lower weight value, and/or 2) the number of data fixes collected during the zones, wherein a larger number of data fixes results in a higher weight value, and a smaller number of data fixes results in a lower weight value. Additionally, the weight values may be based on other factors. In some embodiments, the weights can be selected to be 0 for all revisit zones except the most recent one, and be selected to be 1 for the most recent revisit zone. The weights can also correspond to a different set of quality criteria, favoring one revisit zone over another owing to better data collected in one revisit zone than in the other.

In some embodiments, if data is collected for a first revisit zone when the 2D position is determined to move around frequently and data is collected for a second revisit zone when the 2D position is determined to be stable, then the second revisit zone may have a weight value larger than that of the first revisit zone. In some embodiments, if data is collected for a first revisit zone during a time period that is determined to experience large temperature variations, and data is collected for a second revisit zone during a time period that is determined to experience low or mild temperature variations, then the weight value for the second revisit zone would be more than that of the first revisit zone.

In some embodiments, an alternative technique for calculating the relative calibration adjustment values may be to model the drift based on a polynomial function, random walk drift, etc., and extrapolate relative calibration determined in one or more revisit zones to a time of interest. This has an advantage of potentially having more accurate relative accuracy predictions if a large amount of time has passed between calibrations.

A calibration value confidence is associated with each absolute calibration value (an absolute calibration confidence) and adjusted absolute calibration value (an adjusted absolute calibration confidence). The calibration value confidence is defined as a range of values that the true calibration is expected to be within, to a given confidence value (e.g. about 90% confidence). After an absolute calibration is performed, the calibration value confidence is generally aged, or "propagated," over time according to a drift model, such that the calibration value confidence or "quality" gets progressively worse or larger. However, the calibration value confidence is only propagated during time periods of unknown calibration, i.e., outside of time periods when the calibration can be tracked, such as during time periods of absolute calibration or relative calibration. These time periods of unknown calibration are referred to herein as "confidence propagation periods".

FIG. 20 illustrates a graph 2000 of example calibration values vs time for data collections during repeat visits to revisit zones with confidence propagation periods. At time=0, the initial absolute calibration value 2001 is determined. Between about time=120 (a first initial repeat visit A at cluster 2002) and about time=220 (a first most recent repeat visit A at cluster 2003), data fixes are collected for a first revisit zone A. Between about time=320 (a second initial repeat visit B at cluster 2004) and about time=420 (a second most recent repeat visit B at cluster 2005), data fixes are collected for a second revisit zone B. At about time=600, the adjusted absolute calibration value 2006 is determined using the data collected for the two revisit zones as described above. Additionally, FIG. 20 shows a first confidence propagation period A between the time point (time=0) for which the initial absolute calibration value 2001 is determined and the time point (about time=120) when the data fixes for the cluster 2002 for the first initial repeat visit A are collected, a second confidence propagation period B between the time point (about time=220) when the data fixes for the cluster 2003 for the first most recent repeat visit A are collected and the time point (about time=320) when the data fixes for the cluster 2004 for the second initial repeat visit B are collected, and a third confidence propagation period C between the time point (about time=420) when the data fixes for the cluster 2005 for the second most recent repeat visit B are collected and the time point (about time=600) when the adjusted absolute calibration value 2006 is determined.

Additionally, there are individual calibration value confidences (not shown) associated with the calibration calculations for the initial absolute calibration value 2001 (the absolute calibration confidence), the first initial repeat-visit calibration A (InitialRepeatCalA) (a first initial calibration confidence), the first most recent repeat-visit calibration A (MostRecentRepeatCalA) (a first most recent calibration confidence), the second initial repeat-visit calibration B (InitialRepeatCalB) (a second initial calibration confidence), and the second most recent repeat-visit calibration B (MostRecentRepeatCalB) (a second most recent calibration confidence). Determining these individual calibration value confidences generally involves measuring and combining confidences in the pressure sensor, weather network measurements, building and terrain databases, etc. Techniques for determining these individual calibration value confidences (or altitude error values or altitude uncertainties) are described in U.S. Pat. No. 10,655,961, U.S. patent application Ser. No. 17/303,686, and U.S. patent application Ser. No. 17/447,027, which are assigned in common with the present application, and which are incorporated herein as if set forth fully herein.

The potential drift of the pressure sensor of the mobile device during a time period when the mobile device is revisiting a revisit zone can generally be accounted for with a relative calibration confidence (RelativeCalConfidence) that is determined by adding the calibration value confidence for the initial repeat-visit calibration (InitialRepeatCal) (an initial or first calibration confidence) to the calibration value confidence for the most recent repeat-visit calibration (MostRecentRepeatCal) (a most recent or second calibration confidence). To determine the relative calibration confidence (RelativeCalConfidence), these individual calibration value confidences can be adjusted by weight terms (e.g, A and B) and can be added linearly, as shown in Equation 4:

RelativeCalConfidence=$A$×MostRecentRepeatCalConfidence+$B$×InitialRepeatCalConfidence,   Equation 4.

or in quadrature, as shown in Equation 5:

$$RelativeCalConfidence = \sqrt{A \times MostRecentRepeatCalConfidence^2 + B \times InitialRepeatCalConfidence^2}.$$   Equation 5

Thus, the potential drift of the pressure sensor of the mobile device during the time periods (about time=120 to 220 and 320 to 420) when the mobile device was revisiting the first and second revisit zones A and B can be accounted for as part of the calibration value confidence in the above manner Additionally, the potential drift of the pressure sensor of the mobile device during the confidence propagation periods A-C can generally be accounted for by calculating an aged absolute calibration value confidence (AgedAbsoluteCalConfidence) (an aged absolute calibration confidence) by propagating the drift model (i.e., "aging") for the calibration value confidence for the initial absolute calibration value during the confidence propagation periods A-C. The aged absolute calibration value confidence, thus, is based on the age of the absolute calibration value. Then an adjusted absolute calibration value confidence (AdjustedAbsoluteCalConfidence) (the adjusted absolute calibration confidence) for the adjusted absolute calibration value can be determined by adding the aged absolute calibration value confidence (AgedAbsoluteCalConfidence) to the relative calibration confidence (RelativeCalConfidence) with appropriate weight terms (e.g., C and D) linearly, as shown in Equation 6:

AdjustedAbsoluteCalConfidence=$C$×AgedAbsoluteCalConfidence+$D$×RelativeCalConfidence,   Equation 6.

or in quadrature, as shown in Equation 7:

$$AdjustedAbsoluteCalConfidence = \sqrt{C \times AgedAbsoluteCalConfidence^2 + D \times RelativeCalConfidence^2}.$$   Equation 7

The adjusted absolute calibration value confidence (AdjustedAbsoluteCalConfidence) is the calibration value confidence for the adjusted absolute calibration value 2006.

The above disclosure describes methods to calibrate barometric pressure sensors using an absolute calibration value and a relative calibration value, wherein the relative calibration value is derived from clusters of data fixes collected at one or more revisit zones. This is beneficial and advantageous in that data collected during less-than-ideal situations (e.g., inside a building at an unknown altitude) can be used to monitor and adjust absolute calibration values in order to maintain a relatively reliable calibration for the pressure sensor in between ideal situations when the pressure sensor can be more highly reliably calibrated.

Determining and Eliminating Anomalies in the Data of Revisit Zones

Repeat-visit measurement data that is grouped together and flagged or labelled as being data fixes in a cluster originating at the same revisit zone for the same repeat visit could potentially be prone to errors or anomalies. For example, an indoor position that is identified as a revisit zone that is used to cluster data fixes could be more incorrect than an outdoor position, since position determination quality tends to degrade in indoor environments. In another example, battery charging information could be incorrect, e.g., due to a degraded battery or a faulty charging cable. Data flagged as from the same revisit zone, but which is not actually from the same revisit zone, could potentially skew the calculations described herein away from a desired or true value and give rise to a sensor calibration that is more inaccurate than is tolerable. Therefore, determining and eliminating such anomalies can advantageously ensure a more reliable calibration calculation and altitude determination.

Anomalies in the labelling of data fixes as being in a cluster for repeat visits to the same revisit zone can be screened either with the cluster or with a specific fix from the clusters. In different embodiments, the anomalies can be identified and removed at different steps in the method or system, for example, during data collection, during data processing, during the cluster determination, during the calibration, etc. Additionally, the steps can also be performed in series or in parallel across different steps.

Figure 22A:
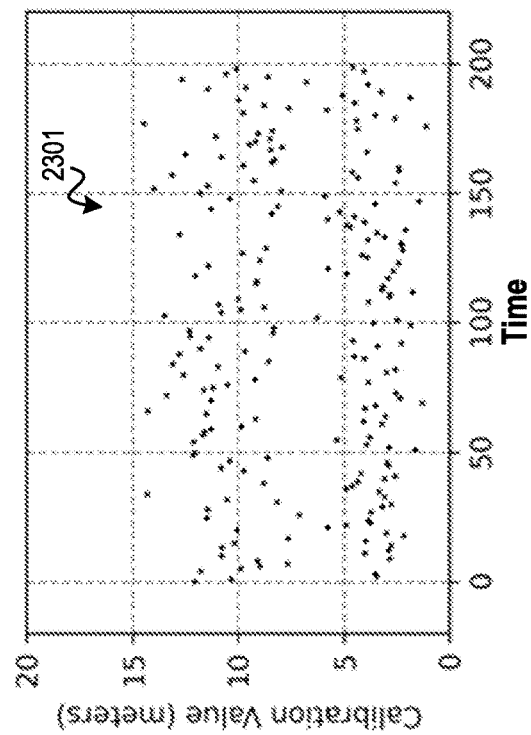
FIGS. 22A, 22B, 23A and 23B illustrate graphs of calibration values vs time for clusters of data, in accordance with some embodiments.
Figure 22B:
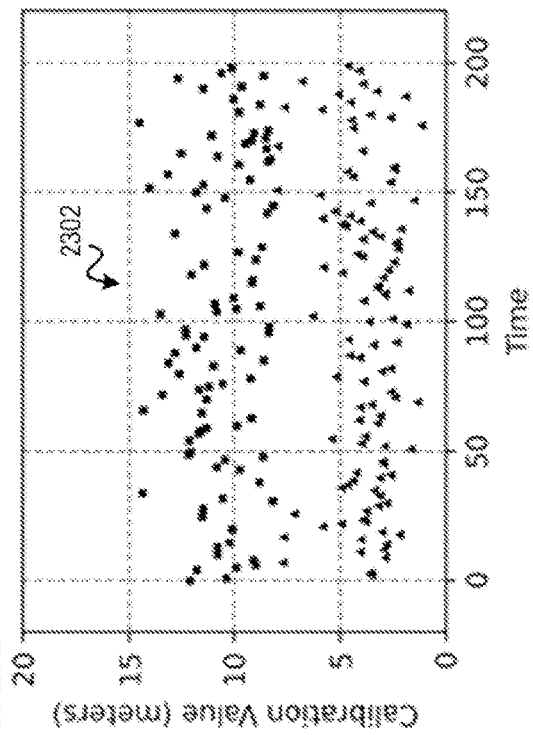

For some embodiments, a simplified example anomaly detection process 2100 is shown in FIG. 21. The specific steps and order of steps of the example anomaly detection process 2100 are shown for illustrative purposes only since other embodiments could include different steps or order of steps to achieve a similar function or result. Upon starting, the example anomaly detection process 2100 generally involves initially clustering (at 2101) the data fixes under an assumption that there is only one cluster feature in the data. Then, using conventional techniques, any outliers (i.e., data fixes that are significantly different than, or that differ by an anomaly threshold value from, those in the cluster as a whole) are detected, flagged or identified (at 2102) as anomalies (anomalous data fixes). An example pre-clustered graph 2201 of calibration values vs time for a cluster of data with some outliers is shown in FIG. 22A, wherein most of the dots (data fixes) are between about 1-6 meters, and a few dots (the outlier data fixes) are substantially greater than 6 meters. If the total number of identified outliers is less than an acceptable maximum outlier-number threshold value (as determined at 2103), then those outlier data fixes (if any) are deleted (at 2104) from the cluster as being anomalies that are potentially erroneous, thereby forming a cluster that is a subset of the original clustered data fixes from which the anomalous or outlier data fixes have been deleted. An example post-clustered graph 2202 of calibration values vs time for a cluster of data after the outliers have been deleted is shown in FIG. 22B, wherein the dots (the remaining data fixes) are those that are between about 1-6 meters. The remaining clusters or data fixes in the cluster(s) are then processed (at 2105) as described above to determine the initial repeat-visit calibration (InitialRepeatCal) or the most recent repeat-visit calibration (MostRecentRepeatCal) as appropriate.

Figure 23A:
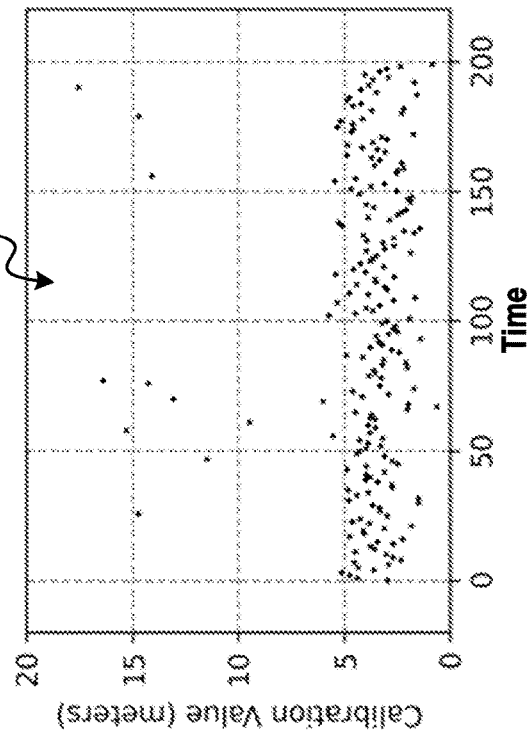
Figure 23B:
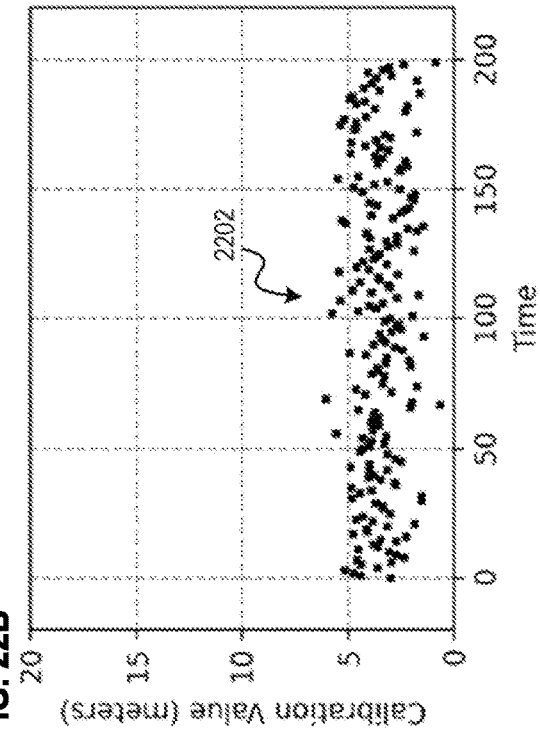

On the other hand, if the total number of identified outliers is greater than the acceptable maximum outlier-number threshold value (as determined at 2103), then the number of cluster features is incremented (at 2106) by one, and the data fixes are re-clustered (at 2101) under an assumption that there are two cluster features in the data. An example pre-clustered graph 2301 of calibration values vs time for data fixes that appear to form two clusters is shown in FIG. 23A, wherein almost half of the dots (data fixes) are between about 1-8 meters, and the other half of the dots (data fixes) are between about 8-15 meters. An additional post-clustered graph 2302 in FIG. 23B shows the two clusters divided into small solid squares and small solid triangles for comparison.

The process 2100 repeats 2102 and 2103, and each time the total number of identified outliers is greater than (not less than or equal to) the acceptable maximum outlier-number threshold value (at 2103), the process 2100 returns to 2101 with the number of cluster features incremented (at 2106) by one, until the total number of identified outliers is less than the acceptable maximum outlier-number threshold value (at 2103), so that the process 2100 can proceed with 2104 and 2105. In some embodiments, if (before 2102) the spread of the data fixes in each cluster is within a given cluster-spread threshold (e.g., about 3 m), then the clusters are processed at 2105. In some embodiments, if the number of cluster features exceeds an acceptable maximum cluster-number threshold value (before 2103), then the either the process 2100 proceeds with 2104 and 2105, or the process 2100 produces an error. The acceptable maximum cluster-number threshold value may be the total number of data fixes or a proportion of the number of data fixes. Additionally, each cluster of data fixes for each repeat visit (e.g., initial and most recent) to the revisit zone can be processed according to the process 2100 to eliminate anomalous data fixes and improve the resulting calibration.

In some embodiments, if the process 2100 proceeds with the assumption that there is more than one cluster associated with the same revisit zone, then this might indicate that there is actually more than one revisit zone at approximately the same 2D position. Such a situation can occur if the user frequently takes the mobile device to more than one room or floor in the same building. Alternatively, or additionally, such a situation can occur if the user takes the mobile device to the same revisit zone at different times of day (e.g., business hours v. non-business hours) when the HVAC pressurization could be different.

There can be a variety of reasons or causes for anomalies in the cluster data for revisit zones. For example, in some embodiments, a revisit zone can be detected when the mobile device connects to the same WiFi access point, but anomalies can arise if the MacID or location clustering is not set up properly. In some embodiments, some anomalies can be related to the overlap of a building footprint with the mobile device footprint, but if the confidence of the mobile device's footprint varies considerably, then the mobile device might not be well localized, thereby resulting in erroneously determining that the mobile device is within the revisit zone when in fact it is not. In some embodiments, some anomalies can be related to the indoor/outdoor (I/O) ratio (e.g., proportion of data fixes that are apparently indoors (or outdoors) compared to all data fixes) with the position of the mobile device, wherein if the number of data fixes falling inside one or more building polygons varies considerably, then the mobile device might not be well localized. In some embodiments, the push and/or pull action of the HVAC system might produce data anomalies if there is no corresponding correlation with reference weather information.

Environmental conditions may also cause data anomalies. For example, in some embodiments, if a temperature measured by a temperature sensor of the mobile device is significantly different for data fixes within the cluster or across revisit zone, then the mobile device is likely moving between the outside and inside of the building, which can cause data anomalies, but the temperature measurements could be used to delineate between the mobile device being inside or outside, so the appropriate data fixes can be deleted from the cluster. In some embodiments, a significantly high rate of pressure change for data fixes within a cluster, or unstable pressure changes, that cannot be explained by ambient pressure changes, may indicate anomalous data fixes in the cluster. In some embodiments, changes in Bluetooth or WiFi signal strengths might indicate that the mobile device is changing locations, so some data fixes might be outside the actual revisit zone. In some embodiments, if the battery charge percentage is decreasing, or the battery charge does not increase appropriately (e.g., increases less than a threshold) within an appropriate time period (e.g., a few hours), or the battery charge apparently remains relatively unchanged for a period of time (e.g., several hours or a day), then the mobile device might not be actually charging or there might be an issue with charging, so the charging status cannot appropriately indicate a revisit zone, and some of the collected data fixes may be anomalous.

In some embodiments, if the horizontal 2D, vertical (Z), or 3D position is unstable or changing erratically, then the device position might be unreliable for calibration, and data fixes might be anomalous. In some embodiments, if the inertial sensor or pressure-based altitude (or other altitude detection technique) indicates that the vertical movement and/or movement in general is unstable, then corresponding data fixes might be anomalous and should be deleted.

Other Aspects

As used herein, altitude represents a height above a designated level (e.g., sea level, ground level, or other level). Estimated positions disclosed herein may be one-dimensional (e.g., altitude), two-dimensional (e.g., latitude and longitude), or three-dimensional (e.g., latitude, longitude and altitude).

Methods of this disclosure may be implemented by hardware, firmware or software. One or more non-transitory machine-readable media embodying program instructions that, when executed by one or more machines, cause the one or more machines to perform or implement operations comprising the steps of any of the described methods are also contemplated. As used herein, machine-readable media includes all forms of statutory machine-readable media (e.g. statutory non-volatile or volatile storage media, statutory removable or non-removable media, statutory integrated circuit media, statutory magnetic storage media, statutory optical storage media, or any other statutory storage media). As used herein, machine-readable media does not include non-statutory media. By way of example, machines may include one or more computing device(s), processor(s), controller(s), integrated circuit(s), chip(s), system(s) on a chip, server(s), programmable logic device(s), other circuitry, and/or other suitable means described herein or otherwise known in the art.

Method steps described herein may be order independent, and can therefore be performed in an order different from that described. It is also noted that different method steps described herein can be combined to form any number of methods, as would be understood by one of skill in the art. It is further noted that any two or more steps described herein may be performed at the same time. Any method step or feature disclosed herein may be expressly restricted from a claim for various reasons like achieving reduced manufacturing costs, lower power consumption, and increased processing efficiency. Method steps performed by a transmitter or a mobile device can be performed by a server, or vice versa.

Systems comprising one or more modules that perform, are operable to perform, or adapted to perform different method steps/stages disclosed herein are also contemplated, where the modules are implemented using one or more machines listed herein or other suitable hardware. When two things (e.g., modules or other features) are "coupled to" each other, those two things may be directly connected together (e.g., shown by a line connecting the two things in the drawings), or separated by one or more intervening things. Where no lines and intervening things connect two particular things, coupling of those things is contemplated unless otherwise stated. Where an output of one thing and an input of another thing are coupled to each other, information (e.g., data and/or signaling) sent from the output is received by the input even if the data passes through one or more intermediate things. All information disclosed herein may be transmitted over any communication pathway using any protocol. Data, instructions, commands, information, signals, bits, symbols, and chips and the like may be represented by voltages, currents, electromagnetic waves, magnetic fields or particles, or optical fields or particles.

The words comprise, comprising, include, including and the like are to be construed in an inclusive sense (i.e., not limited to) as opposed to an exclusive sense (i.e., consisting only of). Words using the singular or plural number also include the plural or singular number, respectively. The word or and the word and, as used in the Detailed Description, cover any of the items and all of the items in a list. The words some, any and at least one refer to one or more. The term may is used herein to indicate an example, not a requirement—e.g., a thing that may perform an operation or may have a characteristic need not perform that operation or have that characteristic in each embodiment, but that thing performs that operation or has that characteristic in at least one embodiment.

By way of example, transmitters described herein may include: antenna module(s) for exchanging signals with other systems; RF front end module(s) with circuitry components that are known or disclosed herein); processing module(s) for performing signal processing (e.g., generating signals for transmission at a selected time, using a selected frequency, using a selected code, and/or using a selected phase), methods described herein, or other processing; memory module(s) for providing storage and retrieval of data and/or instructions relating to methods of operation described herein that may be executed by the processing module(s); sensors module(s) for measuring conditions at or near the transmitter (e.g., pressure, temperature, humidity, wind, or other); and/or interface module(s) for exchanging information with other systems via other links other than a radio link. Signals transmitted by a transmitter may carry different information that, once determined by a mobile device or a server, may identify the following: the transmitter; the transmitter's location (LLA); pressure, temperature, humidity, and/or other conditions at or near the transmitter. Each of these modules may be directly or indirectly coupled to each other.

A mobile device may be in the form of a mobile computing device (e.g., a mobile phone, tablet, laptop, digital camera, tracking tag, mobile device), and may include any of: antenna module(s) for exchanging signals with other systems; RF front end module(s) with circuitry components that are known or disclosed herein; processing module(s) for signal processing of received signals to determine position information (e.g., times of arrival or travel time of received signals, atmospheric information from transmitters, and/or location or other information associated with each transmitter), for using the position information to compute an estimated position of the mobile device, for performing methods described herein, and/or for performing other processing; memory module(s) for providing storage and retrieval of data and/or instructions relating to methods of operation described herein that may be executed by the processing module(s) or other module(s); sensor module(s) for measuring environmental conditions at or near the mobile device (e.g., pressure, temperature, humidity, wind, other), which may be compared to the same environmental conditions at or near transmitters to determine the altitude of the mobile device; other sensor module(s) for measuring other conditions (e.g., acceleration, velocity, orientation, light, sound); interface module(s) for exchanging information with other systems via other links other than a radio link; and/or input/output module(s) for permitting a user to interact with the mobile device. Each of these modules may be directly or indirectly coupled to each other. Processing by the mobile device can also occur at a server.

What is claimed is:

1. A method comprising:
    determining a first plurality of calibration values for a first plurality of visits to a first revisit zone to which a mobile device repeatedly returns;
    determining a first relative calibration adjustment value based on the first plurality of calibration values;
    determining an adjusted absolute calibration value based on i) an absolute calibration value used to calibrate pressure measurements made by a pressure sensor of the mobile device, and ii) the first relative calibration adjustment value; and
    calibrating future pressure measurements made by the pressure sensor of the mobile device using the adjusted absolute calibration value.

2. The method of claim 1, further comprising:
    determining the first relative calibration adjustment value based on a difference between a first calibration value and a second calibration value of the first plurality of calibration values.

3. The method of claim 1, further comprising:
    determining the adjusted absolute calibration value based on a sum of the absolute calibration value and the first relative calibration adjustment value.

4. The method of claim 1, wherein:
    the first revisit zone is a 2D horizontal location.

5. The method of claim 1, wherein:
    the first revisit zone is determined based on a battery of the mobile device being charged.

6. The method of claim 1, wherein:
    the first revisit zone is determined by using a global navigation satellite system.

7. The method of claim 1, wherein:
    the first revisit zone is determined based on a connection with a WiFi access point.

8. The method of claim 1, further comprising:
    determining a second plurality of calibration values for a second plurality of visits to a second revisit zone to which the mobile device repeatedly returns;
    determining a second relative calibration adjustment value based on the second plurality of calibration values;
    determining an overall relative calibration adjustment value based on the first relative calibration adjustment value and the second relative calibration adjustment value; and
    determining the adjusted absolute calibration value based on the absolute calibration value and the overall relative calibration adjustment value.

9. The method of claim 8, further comprising:
    determining the second relative calibration adjustment value based on a difference between a first calibration value and a second calibration value of the second plurality of calibration values.

10. The method of claim 8, further comprising:
    determining the adjusted absolute calibration value based on a sum of the absolute calibration value and the overall relative calibration adjustment value.

11. The method of claim 8, further comprising:
    determining that the second plurality of visits to the second revisit zone do not overlap in time with the first plurality of visits to the first revisit zone; and
    determining the overall relative calibration adjustment value based on a sum of the first relative calibration adjustment value and the second relative calibration adjustment value.

12. The method of claim 8, further comprising:
    determining that the second plurality of visits to the second revisit zone overlap in time with the first plurality of visits to the first revisit zone; and
    determining the overall relative calibration adjustment value based on the first relative calibration adjustment value adjusted by a first weight value and the second relative calibration adjustment value adjusted by a second weight value.

13. The method of claim 1, further comprising:
    determining an absolute calibration confidence for the absolute calibration value;
    determining an aged absolute calibration confidence based on an age of the absolute calibration value;
    determining a first plurality of calibration confidences for the first plurality of calibration values;
    determining a relative calibration confidence based on the first plurality of calibration confidences; and
    determining an adjusted absolute calibration confidence for the adjusted absolute calibration value based on the aged absolute calibration confidence and the relative calibration confidence.

14. The method of claim 13, further comprising:
    determining the relative calibration confidence based on the first plurality of calibration confidences adjusted by a plurality of weight terms.

15. The method of claim 13, further comprising:
    determining a relative calibration time period being between a first visit and a second visit of the first plurality of visits; and
    determining the aged absolute calibration confidence by propagating the absolute calibration value during an unknown calibration time period being outside of the relative calibration time period.

16. The method of claim 1, further comprising:
    determining a first plurality of data fixes collected during a first visit of the first plurality of visits;
    identifying first anomalous data fixes in the first plurality of data fixes;
    forming a first subset of the first plurality of data fixes by deleting the first anomalous data fixes from the first plurality of data fixes; and
    determining a first calibration value of the first plurality of calibration values for the first visit of the first plurality of visits based on the first subset of the first plurality of data fixes.

17. The method of claim 16, further comprising:
    determining a second plurality of data fixes collected during a second visit of the first plurality of visits;
    identifying second anomalous data fixes in the second plurality of data fixes;
    forming a second subset of the second plurality of data fixes by deleting the second anomalous data fixes from the second plurality of data fixes; and
    determining a second calibration value of the first plurality of calibration values for the second visit of the first plurality of visits based on the second subset of the second plurality of data fixes.

18. The method of claim 16, further comprising:
    determining a number of clusters of the first plurality of data fixes; and
    identifying the first anomalous data fixes for the clusters of the first plurality of data fixes.

19. The method of claim 18, further comprising:
    when a total number of the first anomalous data fixes is greater than a maximum threshold value, incrementing the number of clusters and repeating the identifying of the first anomalous data fixes.

* * * * *